US012517248B2

(12) United States Patent
Cai et al.

(10) Patent No.: US 12,517,248 B2
(45) Date of Patent: Jan. 6, 2026

(54) POSITION DETECTION DEVICE, LENS MODULE, IMAGING APPARATUS, AND DISTANCE MEASUREMENT APPARATUS

(71) Applicant: TDK CORPORATION, Tokyo (JP)

(72) Inventors: Yongfu Cai, Tokyo (JP); Kentaro Harada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 925 days.

(21) Appl. No.: 17/730,747

(22) Filed: Apr. 27, 2022

(65) Prior Publication Data
US 2023/0350062 A1 Nov. 2, 2023

(51) Int. Cl.
*G01B 7/30* (2006.01)
*G01D 5/14* (2006.01)
*G01D 5/16* (2006.01)
*G01S 7/481* (2006.01)
*G01S 17/08* (2006.01)

(52) U.S. Cl.
CPC ............. *G01S 17/08* (2013.01); *G01B 7/30* (2013.01); *G01D 5/145* (2013.01); *G01D 5/16* (2013.01); *G01S 7/4817* (2013.01)

(58) Field of Classification Search
CPC ............ G01B 7/30; G01D 5/145; G01D 5/16
USPC ....................................................... 33/355 R
See application file for complete search history.

(56) References Cited

U.S. PATENT DOCUMENTS

| | | | | |
|---|---|---|---|---|
| 10,641,841 B2 * | 5/2020 | Hikichi | ............. | G01R 33/0023 |
| 10,712,178 B2 * | 7/2020 | Uchida | ................. | G01D 5/145 |
| 11,561,079 B2 * | 1/2023 | Harada | .................... | G01B 7/30 |
| 11,614,342 B2 * | 3/2023 | Cai | ........................ | G01D 5/145 |
| | | | | 324/207.22 |
| 2009/0262466 A1 * | 10/2009 | Kurata | .................. | B82Y 25/00 |
| | | | | 360/324 |
| 2010/0176801 A1 * | 7/2010 | Aruga | ................ | G01D 5/2451 |
| | | | | 324/207.22 |

(Continued)

FOREIGN PATENT DOCUMENTS

| | | |
|---|---|---|
| JP | H02-268216 A | 11/1990 |
| JP | 2007-051953 A | 3/2007 |
| JP | 2009-276262 A | 11/2009 |

(Continued)

OTHER PUBLICATIONS

English-language Translation of Apr. 16, 2024 Office Action issued in Japanese Patent Application No. 2023-063041.

*Primary Examiner* — George B Bennett
(74) *Attorney, Agent, or Firm* — Oliff PLC

(57) ABSTRACT

A position detection device includes a magnetic sensor and a first magnetic field generator. The first magnetic field generator is disposed to be spaced from and face the magnetic sensor in a first-axis direction, includes a first multipolar magnet, and generates a first magnetic field to be exerted on the magnetic sensor, the first multipolar magnet including N poles and S poles, the N and S poles being adjacent in the first-axis direction. The magnetic sensor and the first magnetic field generator are provided to be relatively movable with respect to each other in a second-axis direction orthogonal to the first-axis direction. A center position of the magnetic sensor in a third-axis direction orthogonal to both the first-axis direction and the second-axis direction is different from a center position of the first multipolar magnet in the third-axis direction.

22 Claims, 18 Drawing Sheets

(56) References Cited

U.S. PATENT DOCUMENTS

2018/0274945 A1\* 9/2018 Uchida .................. G01D 5/145
2022/0090940 A1 3/2022 Cai

FOREIGN PATENT DOCUMENTS

| JP | 2012-112897 A | 6/2012 |
| JP | 2012-247298 A | 12/2012 |
| JP | 2019-008244 A | 1/2019 |
| JP | 2022-051418 A | 3/2022 |
| WO | 2019/142522 A1 | 7/2019 |

\* cited by examiner

POSITION DETECTION DEVICE, LENS
MODULE, IMAGING APPARATUS, AND
DISTANCE MEASUREMENT APPARATUS

BACKGROUND

The technology relates to a position detection device, a lens module, an imaging apparatus, and a distance measurement apparatus that each include a magnetic sensor.

A position detection device that uses a magnetic sensor has heretofore been proposed. The Applicant has proposed, for example, a camera module including a position detection device (for example, see Japanese Unexamined Patent Application Publication No. 2019-082445). In this camera module, the position detection device detects the position of a lens that moves in performing focusing.

Further, International Publication No. WO 2018/051729 proposes a lens driving device including a position detecting magnet that detects a movement position of a lens holding member, and a magnetism detection member.

SUMMARY

It is desired that a position detection device that uses a magnetic sensor have higher position detection accuracy.

It is desirable to provide a position detection device, a lens module, an imaging apparatus, and a distance measurement apparatus that are each able to exhibit high position detection accuracy.

A position detection device according to one embodiment of the technology includes a magnetic sensor and a first magnetic field generator. The first magnetic field generator is disposed to be spaced from and face the magnetic sensor in a first-axis direction, includes a first multipolar magnet, and generates a first magnetic field to be exerted on the magnetic sensor, the first multipolar magnet including a plurality of N poles and a plurality of S poles, the N and S poles being adjacent to each other in the first-axis direction. The magnetic sensor and the first magnetic field generator are provided to be relatively movable with respect to each other in a second-axis direction orthogonal to the first-axis direction. A center position of the magnetic sensor in a third-axis direction orthogonal to both the first-axis direction and the second-axis direction is different from a center position of the first multipolar magnet in the third-axis direction.

A lens module according to one embodiment of the technology includes a magnetic sensor, a first magnetic field generator, a second magnetic field generator, and a lens. The first magnetic field generator is disposed to be spaced from and face the magnetic sensor in a first-axis direction, includes a first multipolar magnet, and generates a first magnetic field to be exerted on the magnetic sensor, the first multipolar magnet including a plurality of N poles and a plurality of S poles, the N and S poles being adjacent to each other along the first-axis direction. The second magnetic field generator generates a second magnetic field. The magnetic sensor and the second magnetic field generator are provided to be relatively movable with respect to the first magnetic field generator and the lens in a second-axis direction orthogonal to the first-axis direction. A center position of the magnetic sensor in a third-axis direction orthogonal to both the first-axis direction and the second-axis direction is different from a center position of the first multipolar magnet in the third-axis direction.

An imaging apparatus according to one embodiment of the technology includes an imaging element and a lens module. The lens module includes a magnetic sensor, a first magnetic field generator, a second magnetic field generator, and a lens. The first magnetic field generator is disposed to be spaced from and face the magnetic sensor in a first-axis direction, includes a first multipolar magnet, and generates a first magnetic field to be exerted on the magnetic sensor, the first multipolar magnet including a plurality of N poles and a plurality of S poles, the N and S poles being adjacent to each other along the first-axis direction. The second magnetic field generator generates a second magnetic field. The magnetic sensor and the second magnetic field generator are provided to be relatively movable with respect to the first magnetic field generator and the lens in a second-axis direction orthogonal to the first-axis direction. A center position of the magnetic sensor in a third-axis direction orthogonal to both the first-axis direction and the second-axis direction is different from a center position of the first multipolar magnet in the third-axis direction.

A distance measurement apparatus according to one embodiment of the technology is configured to measure a distance to a target object by detecting emitted light. The distance measurement apparatus includes an optical element, a magnetic sensor, and a magnetic field generator. The optical element is configured to change a direction of travel of the light and to rotate. The magnetic field generator is disposed to be spaced from and face the magnetic sensor in a first-axis direction, includes a multipolar magnet, and generates a magnetic field to be exerted on the magnetic sensor, the multipolar magnet including a plurality of N poles and a plurality of S poles, the N and S poles being adjacent to each other along the first-axis direction. The magnetic sensor and the magnetic field generator are provided to be relatively movable with respect to each other in a second-axis direction orthogonal to the first-axis direction. The magnetic field generator is configured to rotate in the second-axis direction around a rotation axis in conjunction with the optical element. A center position of the magnetic sensor in a third-axis direction orthogonal to both the first-axis direction and the second-axis direction is different from a center position of the first multipolar magnet in the third-axis direction.

DETAILED DESCRIPTION

In the following, some embodiments of the technology are described in detail with reference to the drawings. Note that the description is given in the following order.

1. First Embodiment

An example of an imaging apparatus including a lens module that includes a position detection device including a multipolar magnet and a magnetic sensor.

2. Second Embodiment

An example of a distance measurement apparatus including a position detection device.

3. Modification Examples

1. First Embodiment

[Configuration of Imaging Apparatus 100]

Figure 1:
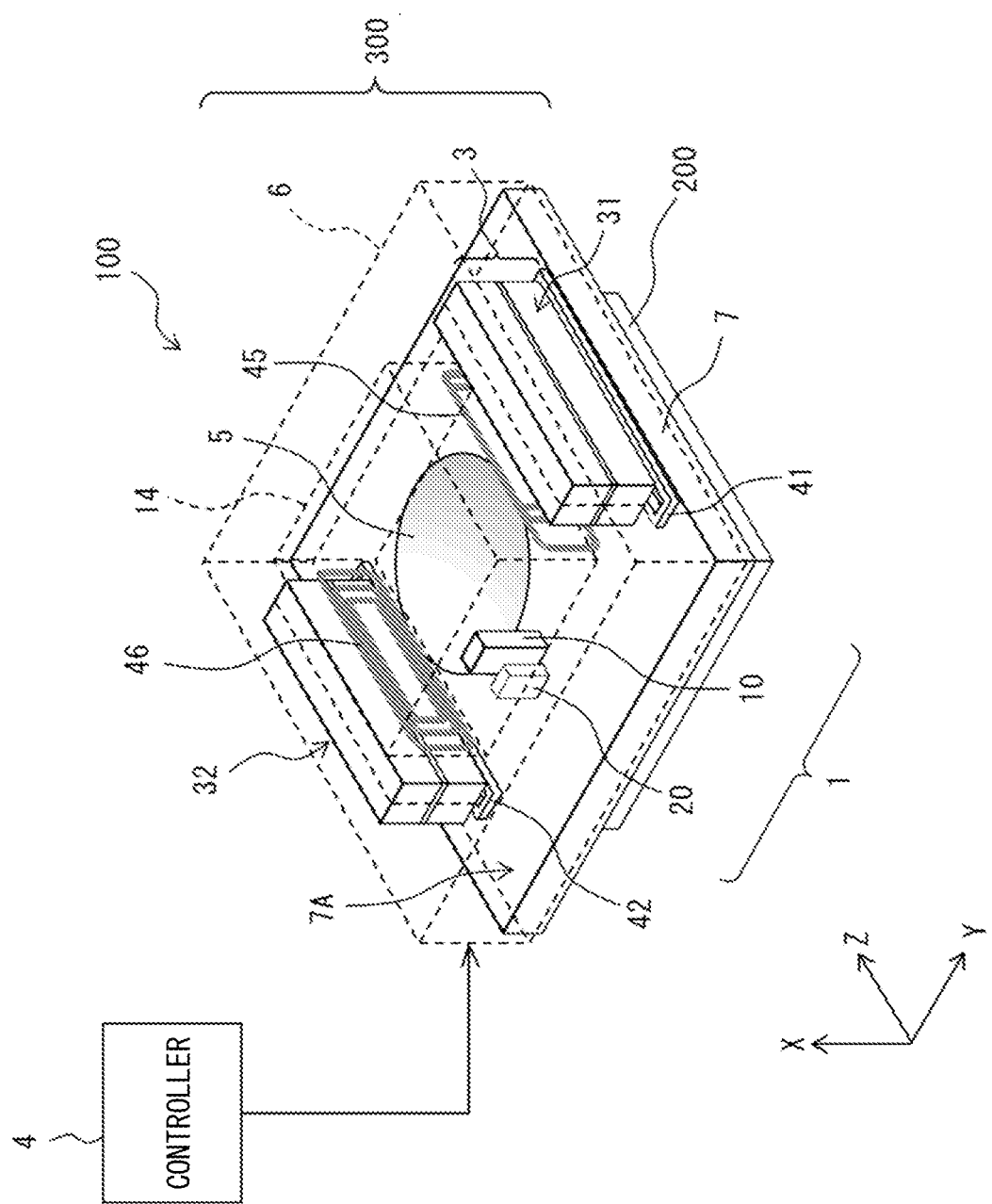
FIG. 1 is a schematic perspective diagram illustrating an overall configuration example of an imaging apparatus including a lens module that includes a position detection device according to one example embodiment of the technology.
Figure 2:
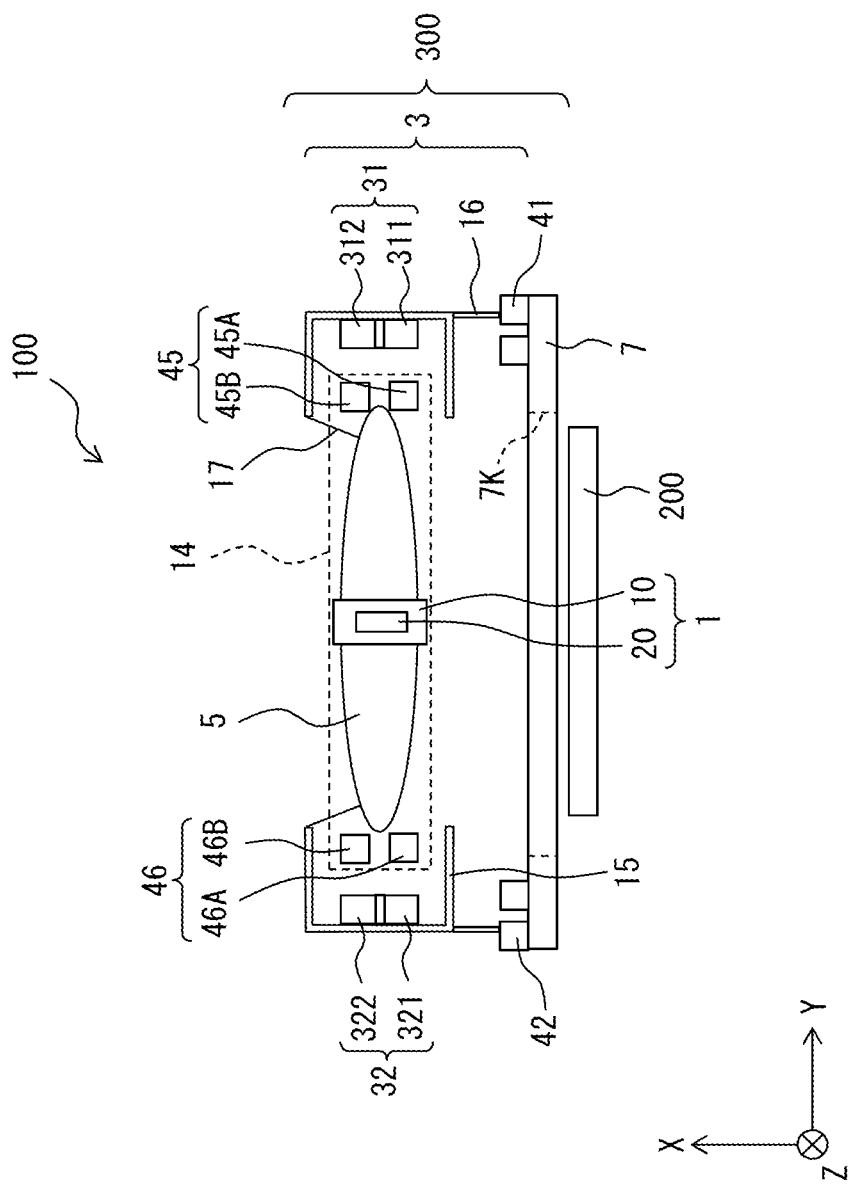
FIG. 2 is a schematic side view of the inside of the imaging apparatus illustrated in FIG. 1.
Figure 3:
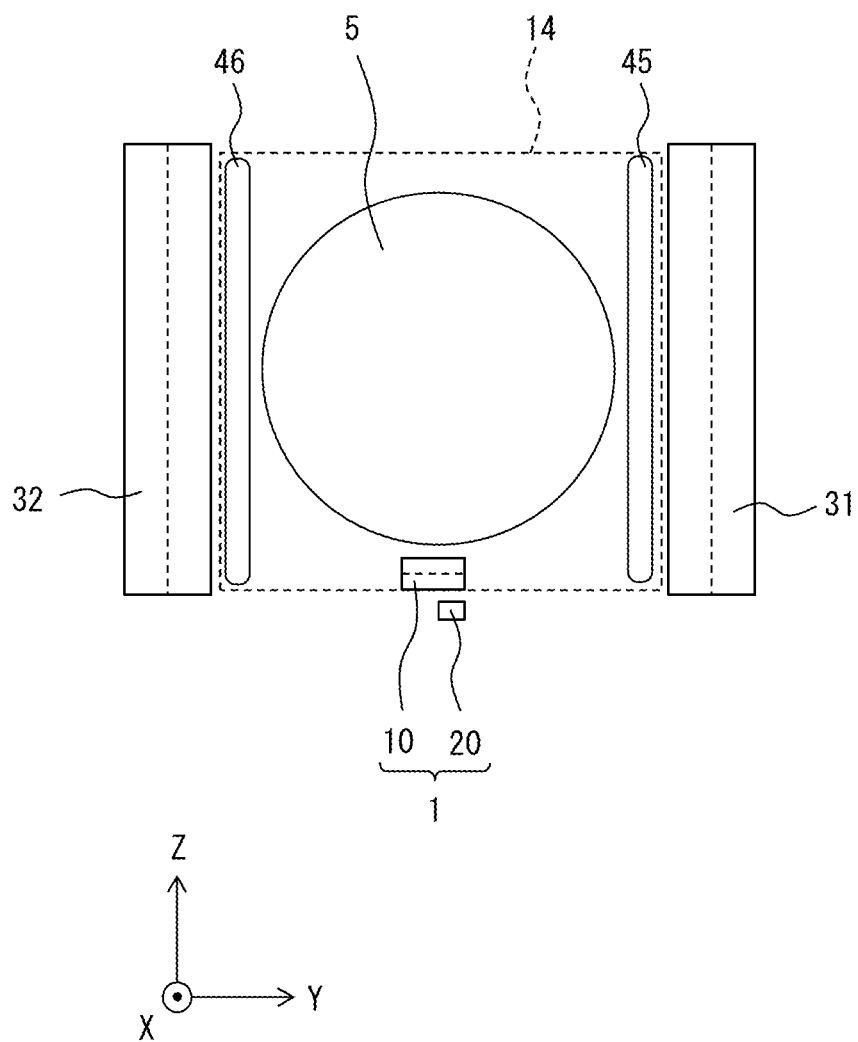
FIG. 3 is a schematic front view of the inside of the imaging apparatus illustrated in FIG. 1.

First, with reference to FIGS. 1 to 3, a description is given of a configuration of an imaging apparatus 100 according to a first embodiment of the technology.

FIG. 1 is a perspective diagram illustrating an overall configuration example of the imaging apparatus 100. FIG. 2 is an explanatory diagram schematically illustrating the inside of the imaging apparatus 100 as viewed from a side direction. FIG. 3 is an explanatory diagram schematically illustrating the inside of the imaging apparatus 100 as viewed from a subject side. Note that in FIGS. 1 to 3, dimensions and locations of components of the imaging apparatus 100 do not necessarily coincide with actual ones. Further, the imaging apparatus 100 illustrated in FIGS. 1 to 3 is a mere example. In the present embodiment, the components of the imaging apparatus 100, and their dimensions, shapes, and locations are not limited to those illustrated in FIGS. 1 to 3.

The imaging apparatus 100 constitutes, for example, a portion of a camera for a smartphone having an optical image stabilization mechanism and an autofocus mechanism. The imaging apparatus 100 includes, for example, an image sensor 200 as an imaging element that acquires an image by using a CMOS or the like, and a lens module 300 that guides light from a subject to the image sensor 200.

[Configuration of Lens Module 300]

The lens module 300 includes a position detection device 1 according to one embodiment of the technology, a driving device 3, a lens 5, a housing 6, and a substrate 7. The position detection device 1 is a magnetic position detection device, and is a mechanism that detects a position of the lens 5 in performing automatic focusing of light incident from the subject (hereinafter, simply "incident light") to allow the incident light to form an image on an imaging plane of the image sensor 200. The driving device 3 is a mechanism that drives the lens 5 to perform the focusing of the incident light. The housing 6 accommodates and protects the position detection device 1, the driving device 3, etc. The substrate 7 has a top surface 7A. Note that FIG. 2 omits the illustration of the housing 6.

Here, an X-axis, a Y-axis, and a Z-axis are defined as illustrated in each of FIGS. 1 to 3. The X-axis, the Y-axis, and the Z-axis are orthogonal to each other. In the present embodiment, the X-axis is perpendicular to the top surface 7A of the substrate 7, and the Y-axis and the Z-axis are both parallel to the top surface 7A of the substrate 7. Further, in the present embodiment, a +X direction is an up direction, and a −X direction is a down direction. Further, a +Z direction and a −Z direction in the present embodiment, that is, directions parallel to the Z-axis, each correspond to one specific example of a "first-axis direction" according to one embodiment of the technology. The +X direction and the −X direction in the present embodiment, that is, directions parallel to the X-axis, each correspond to one specific example of a "second-axis direction" according to one embodiment of the technology. A +Y direction and a −Y direction in the present embodiment, that is, directions parallel to the Y-axis, each correspond to one specific example of a "third-axis direction" according to one embodiment of the technology.

(Lens 5)

The lens 5 is disposed above the top surface 7A of the substrate 7, being oriented with the direction of its optical axis coinciding with the X-axis. Further, as illustrated in FIG. 2, the substrate 7 has an opening 7K that allows light having passed through the lens 5 to pass therethrough. As illustrated in FIG. 2, the lens module 300 is in alignment with the image sensor 200 to allow the light from the subject to enter the image sensor 200 after passing through the lens 5 and the opening 7K of the substrate 7 in order.

(Position Detection Device 1)

Next, a detailed description is given of the position detection device 1 according to the present embodiment.

The position detection device 1 includes a first holding member 14 (see FIG. 2), a second holding member 15, a plurality of wires 16, and a plurality of springs 17. The first holding member 14 holds a first magnet 10 (described later) and the lens 5. The first holding member 14 has, for example, a hollow cylinder shape adapted to allow the lens 5 to be installed therein. Note that the wires 16 and the springs 17 may be omitted from the position detection device 1.

The first holding member 14 is provided to be movable along the direction of the optical axis of the lens 5, that is, along an X-axis direction, with respect to the second holding member 15. In the present embodiment, the second holding member 15 has a box shape adapted to accommodate the lens 5 and the first holding member 14 therein, for example. The plurality of springs 17 couples the first holding member 14 and the second holding member 15 to each other, and supports the first holding member 14 to allow the first holding member 14 to be movable in the X-axis direction with respect to the second holding member 15.

The second holding member 15 is provided above the top surface 7A of the substrate 7 in such a manner as to be movable in both a Y-axis direction and a Z-axis direction with respect to the substrate 7. The plurality of wires 16 couples the substrate 7 and the second holding member 15 to each other, and also supports the second holding member 15 to allow the second holding member 15 to be movable in both the Y-axis direction and the Z-axis direction with respect to the substrate 7. Upon a change in a relative position of the second holding member 15 with respect to the substrate 7, a relative position of the first holding member 14 with respect to the substrate 7 also changes.

The position detection device 1 further includes the first magnet 10 serving as a first magnetic field generator generating a first magnetic field MF1, and a magnetic sensor 20. The first magnetic field MF1 is thus a magnetic field that the first magnet 10 generates. The first magnetic field MF1 includes a magnetic field component Hsx along the X-axis direction and a magnetic field component Hsy along the Y-axis direction. The first magnet 10 is held by the first holding member 14, and is provided to be able to change its relative position with respect to second magnets 31 and 32 serving as a second magnetic field generator generating a second magnetic field MF2. Further, the magnetic sensor 20 and the first magnet 10 are provided to be relatively movable with respect to each other along the X-axis direction while keeping a state of overlapping each other in the Z-axis direction. The first magnet 10 has a substantially rectangular parallelepiped shape in appearance, with its longitudinal direction along the X-axis direction, for example. The first magnet 10 includes a first magnetic material as a principal component. Examples of the first magnetic material include a neodymium-based magnet material such as NdFeB. In one example embodiment, the first magnetic material may be NdFeB of grade N48SH. Alternatively, SmCo may be used as the first magnetic material. The first magnet 10 is a magnet for position detection that generates the first magnetic field MF1 for use to detect the position of the first holding member 14 holding the lens 5.

Further, the first magnet 10 is so fixed to the first holding member 14 as to be located between the second magnet 31 and the second magnet 32 in the Y-axis direction. In other words, the first magnet 10 is held by the first holding member 14. Upon a change in a relative position of the second holding member 15 with respect to the first holding member 14 along the X-axis direction, relative positions of the second magnets 31 and 32 with respect to the first magnet 10 also change along the X-axis direction.

The magnetic sensor 20 detects, as a magnetic field to be detected, a composite magnetic field MF at a predetermined detection position where the magnetic sensor 20 is disposed, and generates a detection signal corresponding to the direction of the composite magnetic field MF. The magnetic sensor 20 is located between the second magnet 31 and the second magnet 32 in the Y-axis direction, and is located opposite to the lens 5 with the first magnet 10 interposed therebetween in the Z-axis direction. The magnetic sensor 20 is fixed to the second holding member 15 together with the second magnets 31 and 32. The first magnet 10 is thus configured to be movable in the X-axis direction with respect to the magnetic sensor 20.

In the present embodiment, the predetermined detection position is the position where the magnetic sensor 20 is disposed. As described above, upon a change in the position in the X-axis direction of the first magnet 10 serving as the first magnetic field generator with respect to the positions of the second magnets 31 and 32 serving as the second magnetic field generator, a distance between the foregoing predetermined detection position and the first magnet 10 changes. The magnetic field to be detected is the composite magnetic field MF of the first magnetic field MF1 and the second magnetic field MF2 at the detection position. The magnetic sensor is located close to the first magnetic field generator, and accordingly, the composite magnetic field MF is derived for the most part from the first magnetic field MF1. Depending on the layout, there may be a case where the second magnetic field MF2 is almost zero. The magnetic sensor 20 is configured to generate a detection signal corresponding to the direction of the composite magnetic field MF and to detect a change in the position of the first magnet 10, that is, a change in the position of the lens 5.

Figure 4A:
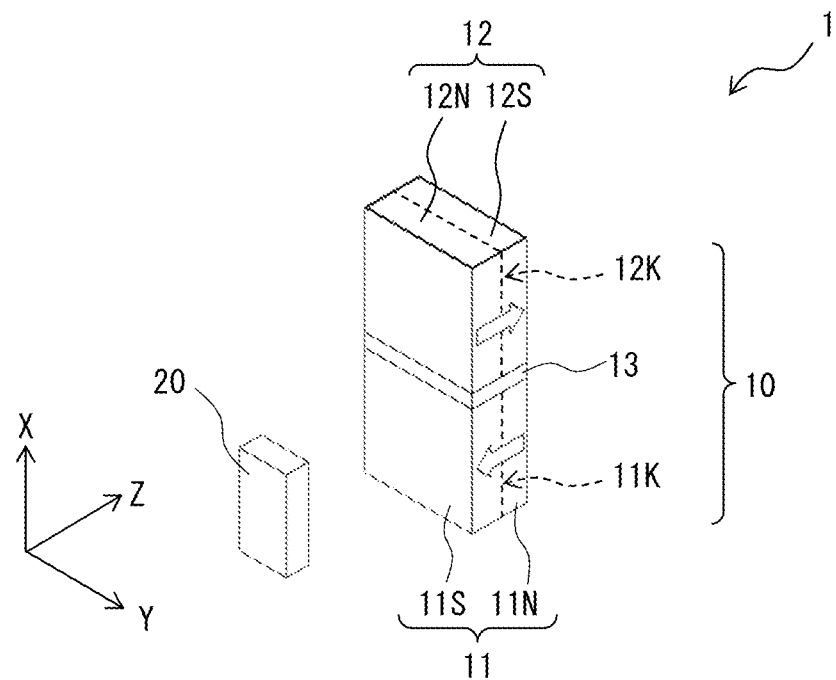
FIG. 4A is an enlarged perspective diagram illustrating a configuration example of the position detection device illustrated in FIG. 1.
Figure 4B:
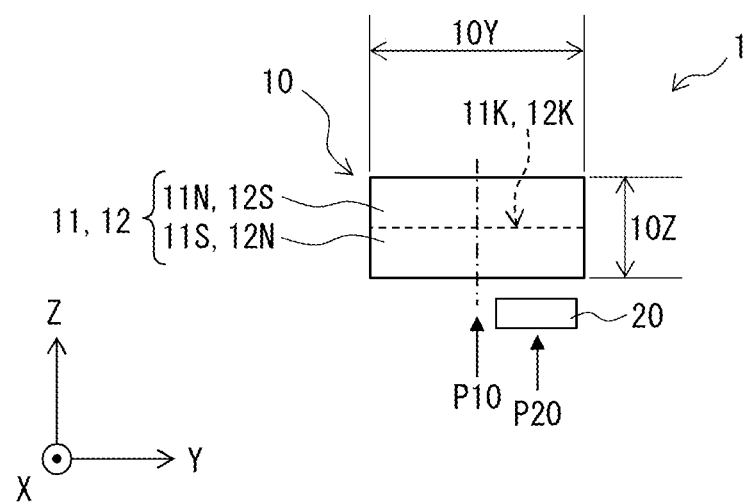
FIG. 4B is a schematic diagram for describing a positional relationship between a first magnet and a magnetic sensor illustrated in FIG. 1.

FIG. 4A is an enlarged perspective view of the first magnet 10 and the magnetic sensor 20 in the position detection device 1. FIG. 4B is a schematic diagram illustrating an example of a state of the magnetic sensor 20 and the first magnet 10 as viewed in the −X direction. Note that, as described above, the first magnet 10 is provided to be movable in the X-axis direction with respect to the magnetic sensor 20. As illustrated in FIGS. 4A and 4B, the first magnet 10 is disposed to be spaced from and face the magnetic sensor 20 in the Z-axis direction, for example. The first magnet 10 is a multipolar magnet including a plurality of N poles 11N and 12N and a plurality of S poles 11S and 12S.

Here, the N pole 11N and the S pole 11S are adjacent to each other in the Z-axis direction. Further, the N pole 12N and the S pole 12S are adjacent to each other in the Z-axis direction. The first magnet 10 includes, for example, a first region portion 11, a second region portion 12, and a neutral zone 13. The first region portion 11 is magnetized, for example, in the −Z direction, and the second region portion 12 is magnetized in the +Z direction opposite to the −Z direction. The neutral zone 13 is interposed between the first region portion 11 and the second region portion 12 in the X-axis direction. In FIG. 4A, arrows drawn within the first region portion 11 and the second region portion 12 indicate respective magnetic field directions of the first region portion 11 and the second region portion 12. The first region portion 11 and the second region portion 12 are adjacent to each other in the X-axis direction which is the direction of movement of the first magnet 10, with the neutral zone 13 interposed therebetween. The first region portion 11 includes the N pole 11N and the S pole 11S adjacent to each other along the Z-axis direction. The second region portion 12 includes the N pole 12N and the S pole 12S adjacent to each other along the Z-axis direction. Here, the N pole 11N and the S pole 12S are disposed to be adjacent to each other in the X-axis direction with the neutral zone 13 interposed therebetween, and the N pole 12N and the S pole 11S are disposed to be adjacent to each other in the X-axis direction with the neutral zone 13 interposed therebetween.

The neutral zone 13 extends along a YZ plane, for example. The neutral zone 13 is a non-magnetized portion which is not magnetized in the first magnet 10.

As illustrated in FIGS. 4A and 4B, an interface 11K between the N pole 11N and the S pole 11S adjacent to each other in the Z-axis direction and an interface 12K between the N pole 12N and the S pole 12S adjacent to each other in the Z-axis direction both extend along an X-Y plane, for example. Here, a center position P20 of the magnetic sensor 20 in the Y-axis direction is different from a center position P10 of the first magnet 10 in the Y-axis direction. FIG. 4B illustrates an example in which the center position P20 is offset from the center position P10 in the Y direction; however, the center position P20 may be offset from the center position P10 in the −Y direction.

In one example embodiment, a length 10Z of the first magnet 10 in the Z-axis direction may be smaller than a length 10Y of the first magnet 10 in the Y-axis direction. Further, at least a portion of the magnetic sensor 20 and at least a portion of the first magnet 10 may overlap each other in the Z-axis direction. Employing such a configuration allows for effective exertion of the first magnetic field MF1 on the magnetic sensor 20 while achieving reductions in size and weight of the position detection device 1.

(Driving Device 3)

Next, a detailed description is given of the driving device 3 according to the present embodiment.

The driving device 3 includes, as the second magnetic field generator generating the second magnetic field MF2, the two second magnets 31 and 32 disposed in a spaced-apart arrangement at different positions from each other. The second magnets 31 and 32 are fixed to the second holding member 15. The second magnets 31 and 32 are thus non-movable with respect to the magnetic sensor 20. The first magnet 10 serving as the first magnetic field generator is provided to be movable along the X-axis direction with respect to the magnetic sensor 20, and with respect to the second magnets 31 and 32 serving as the second magnetic field generator.

As illustrated in FIGS. 1 to 3, the second magnet 31 is located in the +Y direction as viewed from the lens 5. The second magnet 32 is located in the −Y direction as viewed from the lens 5. Thus, in the driving device 3, the two second magnets 31 and 32 are disposed at two respective opposed sides among four sides defining a square or rectangular region along the top surface 7A of the substrate 7, for example.

The second magnet 31 and the second magnet 32 each have a substantially rectangular parallelepiped shape with the longitudinal direction thereof along the Z-axis direction, for example. The second magnet 31 and the second magnet 32 are disposed to be opposed to each other with the lens 5 interposed therebetween in the Y-axis direction orthogonal to the Z-axis direction. The second magnetic field MF2 is a magnetic field in which respective magnetic fields generated by the second magnet 31 and the second magnet 32 are composited, and includes a magnetic field component Hdx along the X-axis direction and a magnetic field component Hdy along the Y-axis direction. The second magnet 31 and the second magnet 32 include a second magnetic material as a principal component. Examples of the second magnetic material include a neodymium-based magnet material such as NdFeB. In one example embodiment, the second magnetic material may be NdFeB of grade N48H. The second magnet 31 and the second magnet 32 are fixed to the second holding member 15. In other words, the second magnetic field generator is held by the second holding member 15. The second magnet 31 and the second magnet 32 are driving magnets that generate drive force to cause the first holding member 14 holding the lens 5 to move along the Z-axis. In addition, the second magnet 31 and the second magnet 32 may be bias magnets to apply a bias magnetic field to the magnetic sensor 20.

Figure 5A:
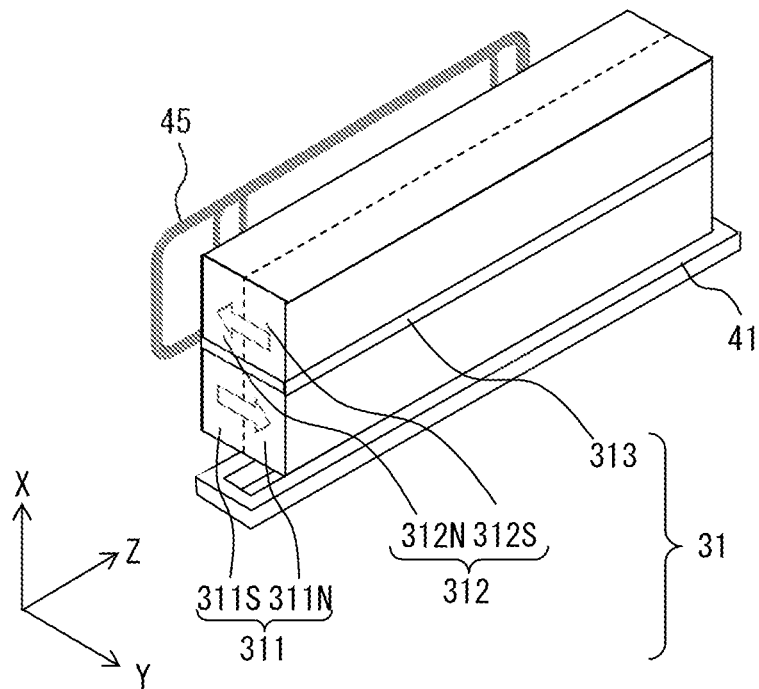
FIG. 5A is an enlarged perspective view of a portion of a driving device illustrated in FIG. 1.
Figure 5B:
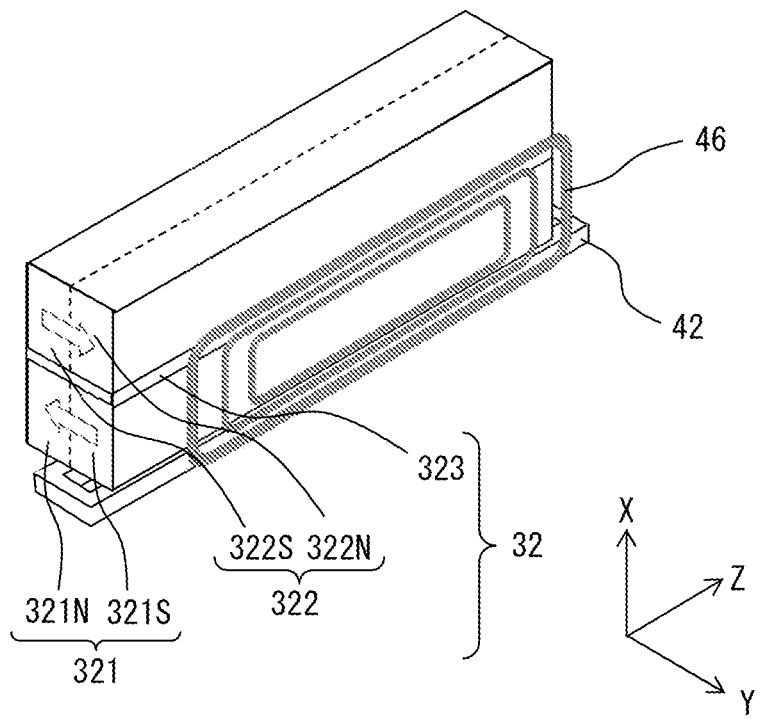
FIG. 5B is an enlarged perspective view of another portion of the driving device illustrated in FIG. 1.

FIG. 5A is an enlarged perspective view of the second magnet 31 and the vicinity thereof in the driving device 3. FIG. 5B is an enlarged perspective view of the second magnet 32 and the vicinity thereof in the driving device 3. As illustrated in FIGS. 5A and 5B, the second magnet 31 and the second magnet 32 may both be multipolar magnets, for example.

As illustrated in FIG. 5A, the second magnet 31 includes, for example, a first region portion 311 magnetized in the +Y direction, a second region portion 312 magnetized in the −Y direction, and a neutral zone 313 interposed between the first region portion 311 and the second region portion 312. In FIG. 5A, arrows drawn within the first region portion 311 and the second region portion 312 indicate respective magnetization directions of the first region portion 311 and the second region portion 312. The first region portion 311 and the second region portion 312 each have a substantially rectangular parallelepiped shape with the longitudinal direction thereof along the Z-axis direction, for example. The first region portion 311 and the second region portion 312 are adjacent to each other in the X-axis direction with the neutral zone 313 interposed therebetween. The first region portion 311 includes an N pole 311N and an S pole 311S adjacent to each other along the Y-axis direction. The second region portion 312 includes an N pole 312N and an S pole 312S adjacent to each other along the Y-axis direction. Here, the N pole 311N and the S pole 312S are disposed to be adjacent to each other in the X-axis direction with the neutral zone 313 interposed therebetween; and the N pole 312N and the S pole 311S are disposed to be adjacent to each other in the X-axis direction with the neutral zone 313 interposed therebetween.

As illustrated in FIG. 5B, the second magnet 32 includes, for example, a first region portion 321 magnetized in the −Y direction, a second region portion 322 magnetized in the +Y direction, and a neutral zone 323 interposed between the first region portion 321 and the second region portion 322. In FIG. 5B, arrows drawn within the first region portion 321 and the second region portion 322 indicate respective magnetization directions of the first region portion 321 and the second region portion 322. The first region portion 321 and the second region portion 322 each have a substantially rectangular parallelepiped shape with the longitudinal direction thereof along the Z-axis direction, for example. The first region portion 321 and the second region portion 322 are adjacent to each other in the X-axis direction with the neutral zone 323 interposed therebetween. The first region portion 321 includes an N pole 321N and an S pole 321S adjacent to each other along the Y-axis direction. The second region portion 322 includes an N pole 322N and an S pole 322S adjacent to each other along the Y-axis direction. Here, the N pole 321N and the S pole 322S are disposed to be adjacent to each other in the X-axis direction with the neutral zone 323 interposed therebetween; and the N pole 322N and the S pole 321S are disposed to be adjacent to each other in the X-axis direction with the neutral zone 323 interposed therebetween.

In addition to the second magnets 31 and 32, the driving device 3 further includes coils 41, 42, 45, and 46.

As illustrated in FIGS. 1 and 2, the coil 41 is disposed between the second magnet 31 and the substrate 7, and the coil 42 is disposed between the second magnet 32 and the substrate 7. Further, the coil 45 is disposed between the second magnet 31 and the lens 5, and the coil 46 is disposed between the second magnet 32 and the lens 5. The coils 41 and 42 are each fixed to the substrate 7. The coils 45 and 46 are each fixed to the first holding member 14.

The coil 41 is subjected mainly to a magnetic field occurring from the second magnet 31. The coil 42 is subjected mainly to a magnetic field occurring from the second magnet 32.

Further, as illustrated in FIG. 2, the coil 45 includes a first conductor part 45A extending along the first region portion 311 of the second magnet 31, and a second conductor part 45B extending along the second region portion 312 of the second magnet 31. Further, as illustrated in FIG. 2, the coil 46 includes a first conductor part 46A extending along the first region portion 321 of the second magnet 32, and a second conductor part 46B extending along the second region portion 322 of the second magnet 32.

Figure 6A:
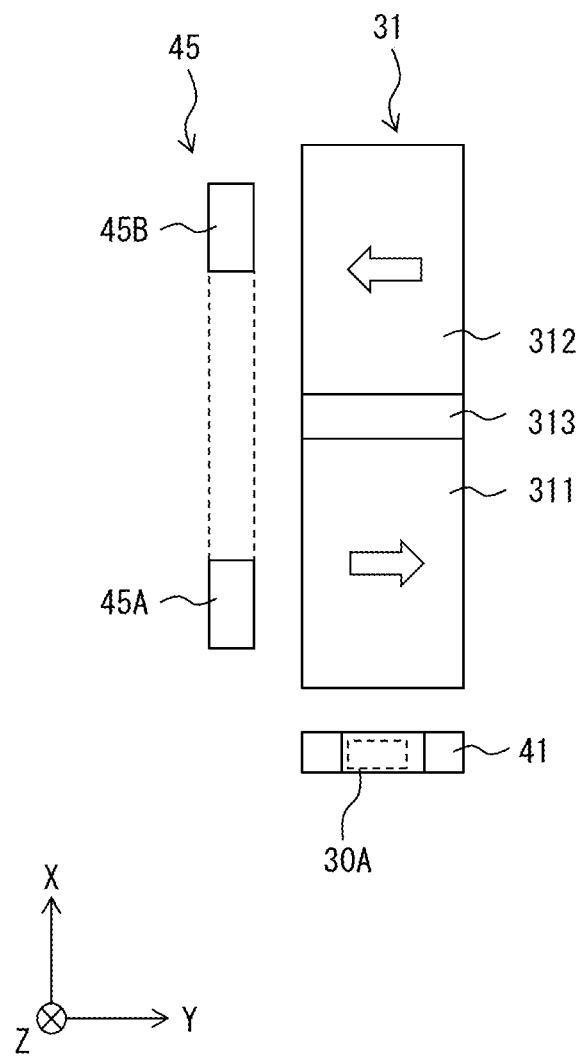
FIG. 6A is an enlarged side view of a portion of the driving device illustrated in FIG. 1.
Figure 6B:
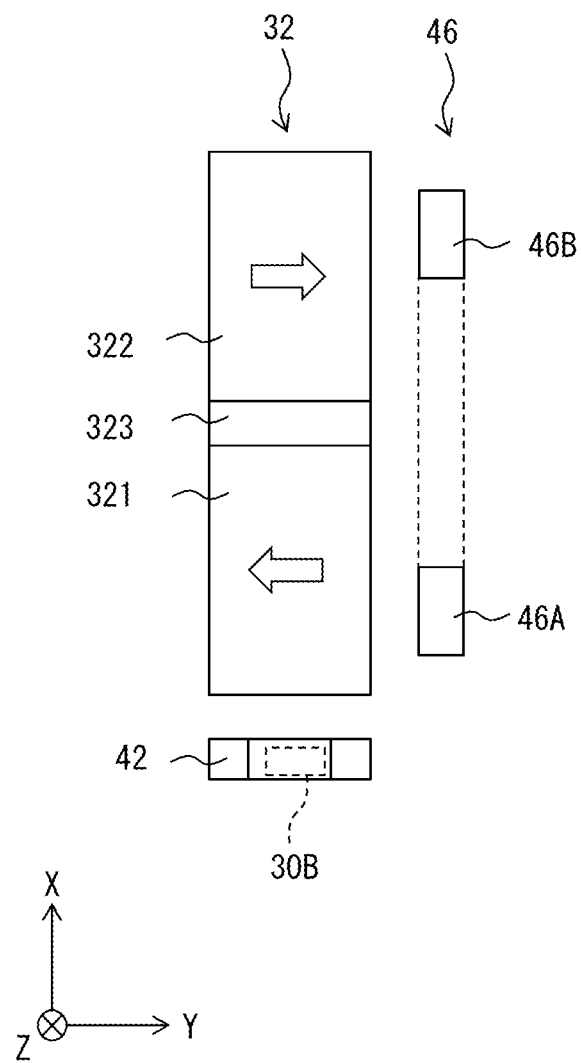
FIG. 6B is an enlarged side view of another portion of the driving device illustrated in FIG. 1.

FIG. 6A is an enlarged side view of the second magnet 31 and the coil 45 of the driving device 3. Further, FIG. 6B is an enlarged side view of the second magnet 32 and the coil 46 of the driving device 3. As illustrated in FIG. 6A, the first conductor part 45A of the coil 45 is subjected mainly to a +Y-direction component of a magnetic field occurring from the first region portion 311 of the second magnet 31. The second conductor part 45B of the coil 45 is subjected mainly to a —Y-direction component of a magnetic field occurring from the second region portion 312 of the second magnet 31. As illustrated in FIG. 6B, the first conductor part 46A of the coil 46 is subjected mainly to a —Y-direction component of a magnetic field occurring from the first region portion 321 of the second magnet 32. The second conductor part 46B of the coil 46 is subjected mainly to a +Y-direction component of a magnetic field occurring from the second region portion 322 of the second magnet 32.

As illustrated in FIGS. 6A and 6B, the driving device 3 further includes a magnetic sensor 30A and a magnetic sensor 30B. The magnetic sensors 30A and 30B are used in changing the position of the lens 5 in order to reduce an influence of a hand-induced apparatus shake.

The magnetic sensor 30A located inside the coil 41 detects the magnetic field occurring from the second magnet 31 and generates a signal corresponding to the position of the second magnet 31. The magnetic sensor 30B located inside the coil 42 detects the magnetic field occurring from the second magnet 32 and generates a signal corresponding to the position of the second magnet 32. The magnetic sensors 30A and 30B are each configurable by, for example, an element that detects a magnetic field, such as a magnetoresistive effect element or a Hall element. Note that the driving device 3 may include only either one of the magnetic sensor 30A located inside the coil 41 or the magnetic sensor 30B located inside the coil 42.

Figure 7:
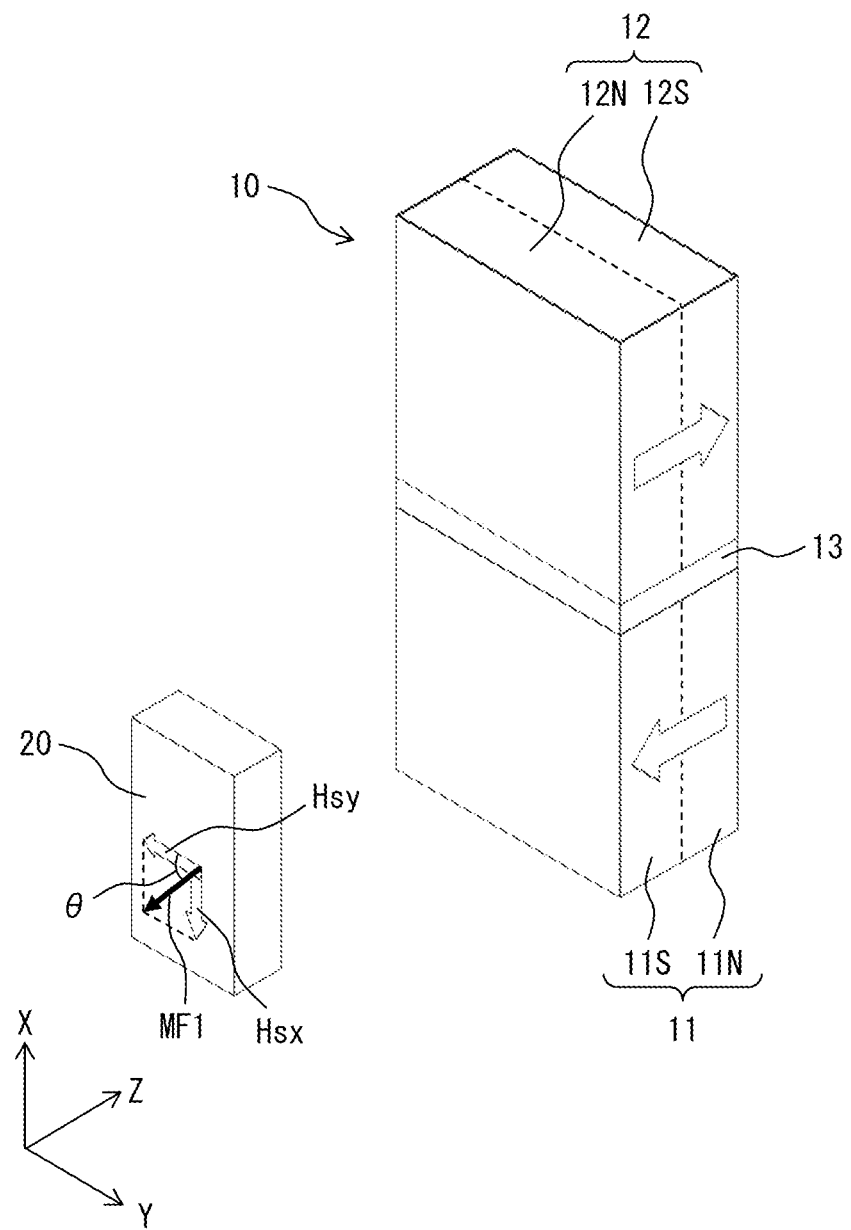
FIG. 7 is a perspective diagram schematically illustrating a first magnetic field and a second magnetic field to be applied to the magnetic sensor illustrated in FIG. 1.

FIG. 7 is a partial perspective view of of the position detection device 1. In FIG. 7, an arrow with a reference sign MF1 represents the first magnetic field MF1 to be exerted on the magnetic sensor 20. As described above, the first magnetic field MF1 includes the magnetic field component Hsx along the X-axis direction and the magnetic field component Hsy along the Y-axis direction.

Figure 8:
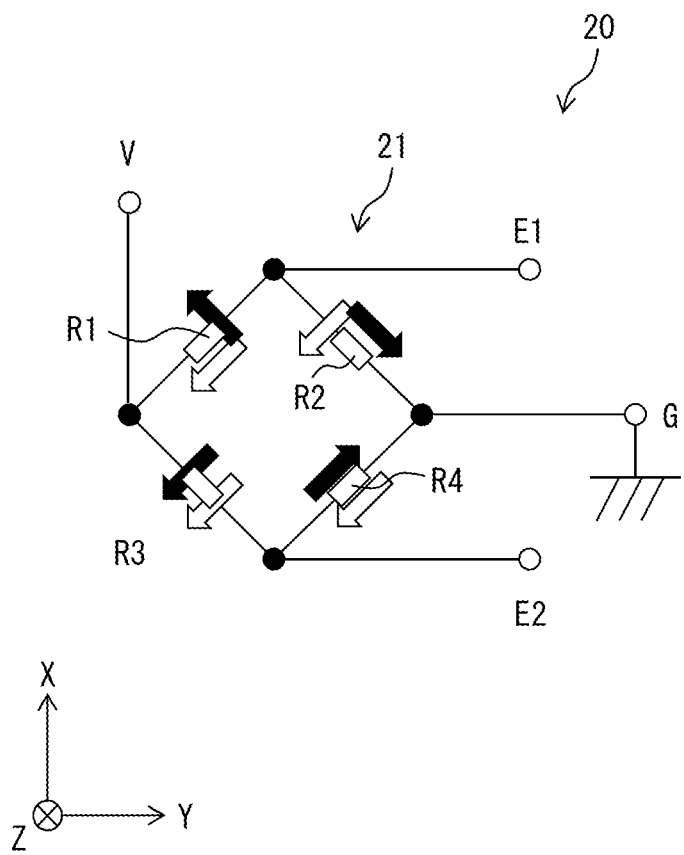
FIG. 8 is a circuit diagram illustrating a circuit configuration of the magnetic sensor in the position detection device illustrated in FIG. 1.

Next, a configuration of the magnetic sensor 20 will be described with reference to FIG. 8. FIG. 8 is a circuit diagram illustrating the configuration of the magnetic sensor 20. In the present embodiment, the magnetic sensor 20 is configured to generate, as the detection signal corresponding to the direction of the composite magnetic field MF which is the magnetic field to be detected, a detection signal corresponding to an angle that the direction of the composite magnetic field MF forms with respect to a reference direction.

As illustrated in FIG. 8, the magnetic sensor 20 includes a Wheatstone bridge circuit 21. The Wheatstone bridge circuit 21 includes a power supply port V, a ground port G, two output ports E1 and E2, a first resistor R1 and a second resistor R2 coupled in series to each other, and a third resistor R3 and a fourth resistor R4 coupled in series to each other. A first end of the first resistor R1 and a first end of the third resistor R3 are each coupled to the power supply port V. A second end of the first resistor R1 is coupled to a first end of the second resistor R2 and the output port E1. A second end of the third resistor R3 is coupled to a first end of the fourth resistor R4 and the output port E2. A second end of the second resistor R2 and a second end of the fourth resistor R4 are each coupled to the ground port G. The power supply port V receives a power supply voltage of a predetermined magnitude. The ground port G is coupled to a ground. The output ports E1 and E2 are each coupled to a controller 4 (FIG. 1).

In the present embodiment, the first to fourth resistors R1 to R4 each include a plurality of magnetoresistive effect elements (MR elements). The MR elements are coupled in series. The MR elements may each be a spin-valve MR element, for example. The spin-valve MR element includes a magnetization pinned layer whose magnetization direction is pinned, a free layer which is a magnetic layer whose magnetization direction changes in accordance with the direction of the magnetic field to be detected, and a nonmagnetic layer disposed between the magnetization pinned layer and the free layer. The spin-valve MR element may be a tunneling magnetoresistive effect element (a TMR element) or a giant magnetoresistive effect element (a GMR element). In the TMR element, the nonmagnetic layer is a tunnel barrier layer. In the GMR element, the nonmagnetic layer is a nonmagnetic electrically-conductive layer. The spin-valve MR element changes in resistance value in accordance with an angle that the magnetization direction of the free layer forms with respect to the magnetization direction of the magnetization pinned layer, and the resistance value becomes minimum when the foregoing angle is 0°, and becomes maximum when the foregoing angle is 180°. In FIG. 8, the filled arrows indicate the magnetization directions of the magnetization pinned layers of the MR elements, and the hollow arrows indicate the magnetization directions of the free layers of the MR elements.

Figure 9:
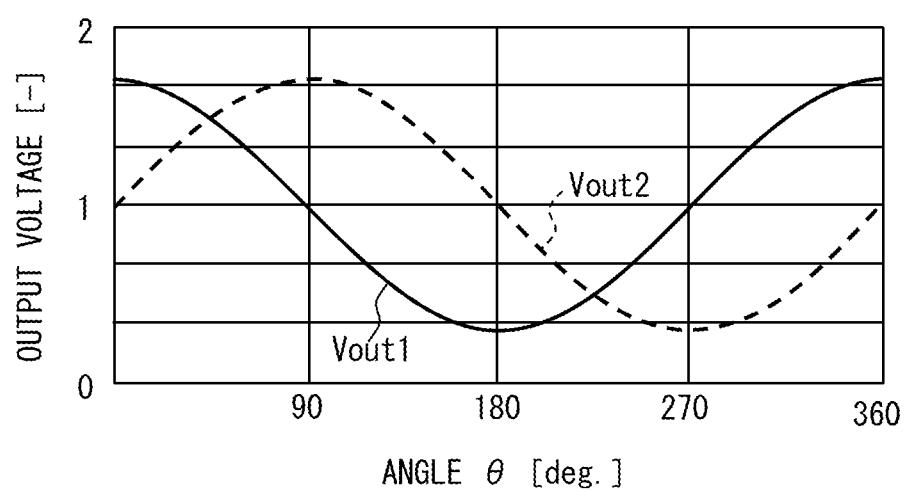
FIG. 9 is a characteristic diagram illustrating an output voltage characteristic obtained from the magnetic sensor illustrated in FIG. 1.

As illustrated in FIG. 8, the magnetization direction of the magnetization pinned layers of the MR elements included in the first resistor R1 (hereinafter simply referred to as a pinned direction of the first resistor R1) and the magnetization direction of the magnetization pinned layers of the MR elements included in the second resistor R2 (hereinafter simply referred to as a pinned direction of the second resistor R2) are opposite to each other. Further, the magnetization direction of the magnetization pinned layers of the MR elements included in the third resistor R3 (hereinafter simply referred to as a pinned direction of the third resistor R3) and the magnetization direction of the magnetization pinned layers of the MR elements included in the fourth resistor R4 (hereinafter simply referred to as a pinned direction of the fourth resistor R4) are opposite to each other. Further, the pinned direction of the first resistor R1 and the pinned direction of the second resistor R2 are orthogonal to the pinned direction of the third resistor R3 and the pinned direction of the fourth resistor R4. Therefore, as illustrated in FIG. 9, for example, in a case where a voltage Vout1 outputted to the output port E1 changes in a cosinusoidal manner in accordance with an angle θ that the direction of the composite magnetic field MF forms with respect to the reference direction, a voltage Vout2 outputted to the output port E2 changes in a sinusoidal manner in accordance with the angle θ. In other words, the voltage Vout1 and the voltage Vout2 have a phase difference of 90° with respect to each other for the angle θ. A signal corresponding to a potential difference between the output ports E1 and E2 is outputted as a detection signal from a difference detector. The detection signal depends on a potential at the output port E1, a potential at the output port E2, and the potential difference between the output ports E1 and E2. The detection signal changes in accordance with the direction of the composite magnetic field MF which is the magnetic field to be detected.

Note that, in consideration of a factor such as the degree of accuracy in fabrication of the MR elements, the magnetization directions of the magnetization pinned layers in the MR elements may slightly differ from the above-described directions.

Figure 10:
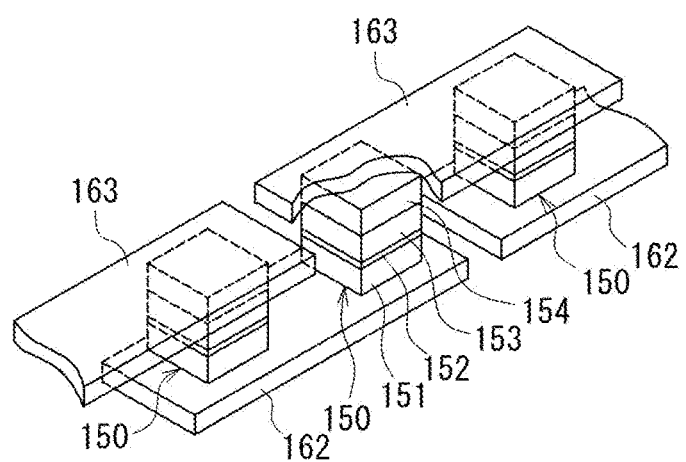
FIG. 10 is a perspective view of a portion of one resistor in FIG. 8.

Now, with reference to FIG. 10, a description is given of an example configuration of the first to fourth resistors R1 to R4. FIG. 10 is a perspective view of a portion of one resistor in the magnetic sensor 20 illustrated in FIG. 8. In this example, the one resistor includes a plurality of lower electrodes 162, a plurality of magnetoresistive effect (MR) elements 150, and a plurality of upper electrodes 163. The lower electrodes 162 are disposed on an unillustrated substrate. The lower electrodes 162 each have a long slender shape. Every two lower electrodes 162 adjacent to each other in the longitudinal direction thereof have a gap therebetween. As illustrated in FIG. 10, the MR elements 150 are disposed on the top surface of the lower electrode 162 at respective positions near opposite ends of the lower electrode 162 in the longitudinal direction thereof. The MR elements 150 each include, for example, a magnetization free layer 151, a nonmagnetic layer 152, a magnetization pinned layer 153, and an antiferromagnetic layer 154 that are stacked in order from the lower electrode 162 side. The magnetization free layer 151 is electrically coupled to the lower electrode 162. The antiferromagnetic layer 154 includes an antiferromagnetic material, and is exchange-coupled to the magnetization pinned layer 153 to thereby pin the magnetization direction of the magnetization pinned layer 153. The upper electrodes 163 are disposed on the MR elements 150. The upper electrodes 163 each have a long slender shape, and electrically couple the respective antiferromagnetic layers 154 of two adjacent MR elements 150 that are disposed on two lower electrodes 162 adjacent to each other in the longitudinal direction of the lower electrodes 162. With such a configuration, the resistor illustrated in FIG. 10 includes the MR elements 150 coupled in series by the lower electrodes 162 and the upper electrodes 163. Note that the magnetization free layer 151, the nonmagnetic layer 152, the magnetization pinned layer 153, and the antiferromagnetic layer 154 in the MR element 150 may be arranged in the reverse order to that illustrated in FIG. 10.

Next, a description is given of operations of the driving device 3 with reference to FIGS. 1 to 6B. To begin with, the optical image stabilization mechanism and the autofocus mechanism will be described briefly. The driving device 3 constitutes a portion of each of the optical image stabilization mechanism and the autofocus mechanism. The driving device 3, the optical image stabilization mechanism, and the autofocus mechanism are controlled by the controller 4 (see FIG. 1) provided outside the imaging apparatus 100. The controller 4 includes, for example, circuitry including a central processing unit (CPU) which is an operational processing unit, a read only memory (ROM) which is a storage element that holds programs, operational parameters, etc. to be used by the CPU, and a random access memory (RAM) which is a storage element that temporarily holds parameters, etc. that change as appropriate during execution by the CPU.

The optical image stabilization mechanism is configured to be able to detect a hand-induced apparatus shake by using a gyro sensor or the like located outside the imaging apparatus 100, for example. Upon detection of a hand-induced apparatus shake by the optical image stabilization mechanism, the controller 4 controls the driving device 3 to cause a relative position of the lens 5 with respect to the substrate 7 to change in accordance with the mode of the apparatus shake. This makes it possible to stabilize the absolute position of the lens 5 to thereby reduce an influence of the apparatus shake. Note that the relative position of the lens 5 with respect to the substrate 7 changes either in a direction parallel to the Y-axis or in a direction parallel to the Z-axis, depending on the mode of the apparatus shake.

The autofocus mechanism is configured to be able to detect an in-focus state of a subject by using, for example, the image sensor 200, an autofocus sensor, or the like. The controller 4 controls the driving device 3 to change the relative position of the lens 5 with respect to the substrate 7 along the X-axis to bring the subject into focus. It is thereby possible to achieve automatic focusing on the subject.

Next, a description is given of an operation of the driving device 3 related to the optical image stabilization mechanism. Upon passage of electric currents through the coils 41 and 42 by the controller 4, an interaction between the magnetic fields occurring from the second magnets 31 and 32 and magnetic fields occurring from the coils 41 and 42 causes the second holding member 15 with the second magnets 31 and 32 fixed thereto to move along the Y-axis.

As a result, the lens 5 also moves along the Y-axis. The controller 4 detects the position of the lens 5 by measuring the signals corresponding to the positions of the second magnets 31 and 32 generated by the magnetic sensors 30A and 30B.

Next, a description is given of an operation of the driving device 3 related to the autofocus mechanism. In a case of moving the relative position of the lens 5 with respect to the substrate 7 along the X-axis, the controller 4 passes an electric current through the coil 45 to cause the electric current to flow through the first conductor part 45A in the +Y direction and flow through the second conductor part 45B in the −Y direction. The controller 4 further passes an electric current through the coil 46 to cause the electric current to flow through the first conductor part 46A in the −Y direction and flow through the second conductor part 46B in the +Y direction. These electric currents and the magnetic fields occurring from the second magnets 31 and 32 cause a Lorentz force in the X direction to be exerted on the first conductor part 45A and the second conductor part 45B of the coil 45 and on the first conductor part 46A and the second conductor part 46B of the coil 46. This causes the first holding member 14 with the coils 45 and 46 fixed thereto to move in the +X direction. As a result, the lens 5 also moves in the +X direction.

In a case of moving the relative position of the lens 5 with respect to the substrate 7 in the −X direction, the controller 4 passes electric currents through the coils 45 and 46 in directions opposite to those in the case of moving the relative position of the lens 5 with respect to the substrate 7 in the +X direction.

[Workings and Effects of Imaging Apparatus 100]

Next, a description is given of workings and effects of the position detection device 1 according to the present embodiment, and the imaging apparatus 100 including the same. The position detection device 1 according to the present embodiment is used to detect the position of the lens 5. In the present embodiment, in the case where the relative position of the lens 5 with respect to the substrate 7 changes, the relative position of the first holding member 14 with respect to the substrate 7 and the second holding member 15 also changes. As described above, the first holding member 14 holds the first magnet 10 serving as the first magnetic field generator, and the lens 5, while the second holding member 15 holds the second magnets 31 and 32 serving as the second magnetic field generator, and the magnetic sensor 20. Accordingly, upon a change in the relative position of the lens 5 as described above, the relative position of the first magnet 10 with respect to the second magnets 31 and 32 and the magnetic sensor 20 changes. In the present embodiment, the direction of change of the relative position of the first magnet 10 with respect to the second magnets 31 and 32 and the magnetic sensor 20 is along the optical axis of the lens 5, that is, parallel to the X-axis.

While the relative position of the first magnet 10 with respect to the second magnets 31 and 32 and the magnetic sensor 20 changes, relative positions of the second magnets 31 and 32 with respect to the magnetic sensor 20 do not change. Therefore, upon a change in the relative position of the first magnet 10 with respect to the second magnets 31 and 32 and the magnetic sensor 20, neither of the intensity and the direction of the second magnetic field MF2 changes; however, the intensity and the direction of the first magnetic field MF1 change. If the intensity and the direction of the first magnetic field MF1 change, the direction and the intensity of the composite magnetic field MF also change, and this results in a change in the value of the detection signal that the magnetic sensor 20 generates. Thus, the value of the detection signal that the magnetic sensor 20 generates changes in a manner dependent on the relative position of the first magnet 10 with respect to the substrate 7. The controller 4 is configured to determine the angle θ of the direction of the composite magnetic field MF by performing operational processing from the detection signal of the magnetic sensor 20 that varies with magnetic field components including the magnetic field component Hsx along the X-axis direction and the magnetic field component Hsy along the Y-axis direction. The relative position of the first magnet 10 with respect to the substrate 7 indicates the relative position of the lens 5 with respect to the substrate 7.

As described above, the magnetic sensor 20 includes the Wheatstone bridge circuit 21 including, for example, the first to fourth resistors R1 to R4, and the respective pinned directions of the first to fourth resistors R1 to R4 are antiparallel or orthogonal to each other. This makes it possible for the magnetic sensor 20 to detect, for example, a magnetic field Hx in the X-axis direction and a magnetic field Hy in the Y-axis direction that are included in the composite magnetic field MF.

The angle θ of the direction of the composite magnetic field MF is defined by Equation (1) below.

$$\theta = \arctan 2(Hsx+Hdx, Hsy+Hdy) \quad (1)$$

where Hsx is a magnetic field component along the X-axis direction of the first magnetic field MF1, Hdx is a magnetic field component along the X-axis direction of the second magnetic field MF2, Hsy is a magnetic field component along the Y-axis direction of the first magnetic field MF1, and Hdy is a magnetic field component along the Y-axis direction of the second magnetic field MF2.

Here, the magnetic field component Hdx and the magnetic field component Hdy to be exerted on the magnetic sensor 20 are much weaker than the magnetic field component Hsx and the magnetic field component Hsy to be exerted on the magnetic sensor 20. Therefore, in determining the angle θ of the direction of the composite magnetic field MF, the magnetic field components Hdx and Hdy are substantially negligible. The angle θ of the direction of the composite magnetic field MF to be exerted on the magnetic sensor 20 is thus expressible by Equation (2) below:

$$\theta \approx \arctan 2(Hsx, Hsy) \quad (2).$$

Thus, the angle θ varies depending on the magnetic field component Hsx and the magnetic field component Hsy.

Figure 11A:
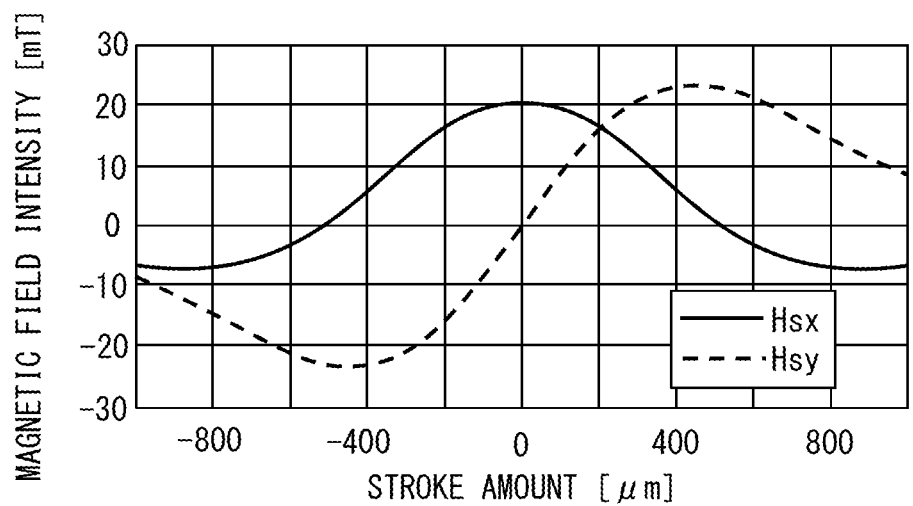
FIG. 11A is a characteristic diagram illustrating changes in intensity of a magnetic field applied to the magnetic sensor associated with movement of the first magnet in the imaging apparatus illustrated in FIG. 1.
Figure 11B:
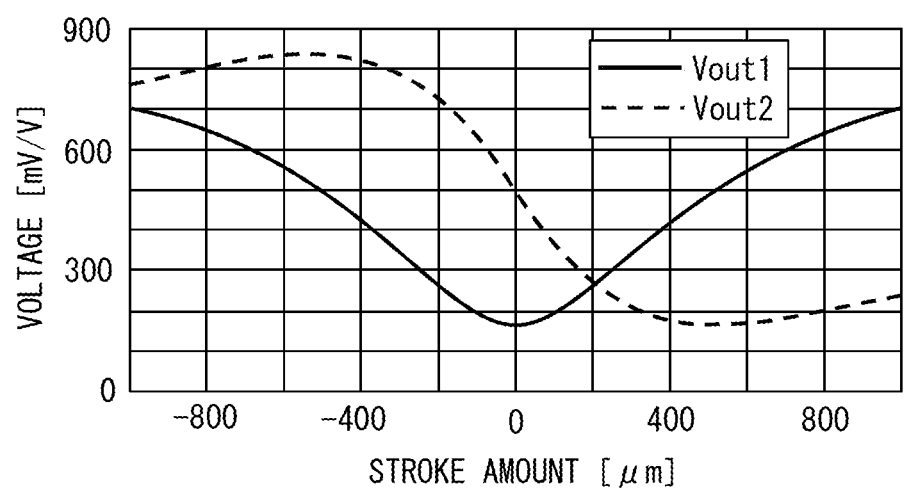
FIG. 11B is a characteristic diagram illustrating changes in output voltage obtained from the magnetic sensor associated with movement of the first magnet in the imaging apparatus illustrated in FIG. 1.
Figure 11C:
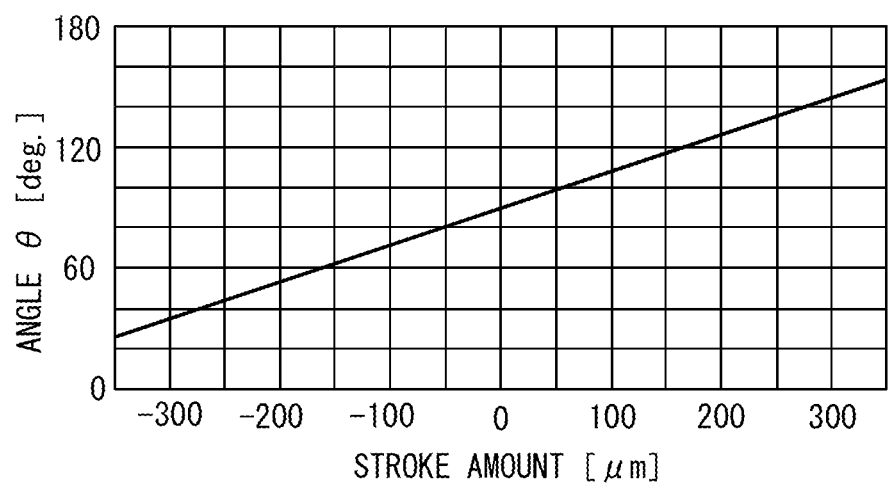
FIG. 11C is a characteristic diagram illustrating changes in angle of a composite magnetic field of the first magnet and a second magnet with respect to a stroke amount of the first magnet.

In the imaging apparatus 100, as the first magnet 10 moves with respect to the magnetic sensor 20 along the X-axis direction, the magnetic sensor 20 is subjected to the first magnetic field MF1 including the magnetic field component Hsx along the X-axis direction and the magnetic field component Hsy along the Y-axis direction that change as illustrated in FIG. 11A, for example. At this time, the voltages Vout1 and Vout2 that change as illustrated in FIG. 11B are each detected at the magnetic sensor 20. In FIG. 11A, the horizontal axis represents a position (a stroke amount) [μm] of the first magnet 10 with respect to a reference position, and the vertical axis represents a magnetic field intensity [mT] detected at the magnetic sensor 20. Further, in FIG. 11B, the horizontal axis represents the position (the stroke amount) [μm] of the first magnet 10 with respect to the reference position, and the vertical axis represents a voltage [mV/V] outputted from the magnetic sensor 20. The controller 4 treats the voltage Vout1 and the voltage Vout2 respectively as a cosine curve (V×cos θ+V/2)

and a sine curve (V×sin θ+V/2) for the angle θ of the direction of the composite magnetic field MF, and calculates the angle θ that changes with the position of the first magnet 10 in the X-axis direction (see FIG. 1IC) in accordance with the following equation: θ [deg.]=arctan(T×(V×sin θ)/(V× cos θ)). In FIG. 11C, the horizontal axis represents the position (the stroke amount) [urn] in the X-axis direction of the first magnet 10 with respect to the reference position, and the vertical axis represents the angle θ [deg.]. As illustrated in FIG. 11C, the angle θ changes substantially linearly with respect to the stroke amount of the first magnet 10. Therefore, the position (the stroke amount) in the X-axis direction of the first magnet 10 is unambiguously determined by calculating the angle θ. Note that the constant T in the above equation is a correction factor for determining linearity.

As described above, according to the position detection device 1 of the present embodiment, a multipolar magnet is used as the first magnet 10 which is movable in the X-axis direction while being spaced from and facing the magnetic sensor 20 in the Z-axis direction. Accordingly, it is possible to subject the magnetic sensor 20 to the magnetic field component Hsx in the X-axis direction and the magnetic field component Hsy in the Y-axis direction that have a phase difference (e.g., a phase difference of 90°) with respect to each other. Furthermore, in the position detection device 1, the center position P20 of the magnetic sensor 20 in the Y-axis direction is different from the center position P10 of the first magnet 10 in the Y-axis direction. This allows for sufficient application of the magnetic field component Hsx to the magnetic sensor 20. Accordingly, the position detection device 1 of the present embodiment makes it possible to detect the angle θ of the composite magnetic field MF corresponding to the stroke amount of the first magnet 10 with high accuracy by using the magnetic field component Hsx and the magnetic field component Hsy detected at the magnetic sensor 20.

Here, the intensity of the magnetic field component Hsx and the intensity of the magnetic field component Hsy each vary depending on the distance between the first magnet 10 and the magnetic sensor 20. However, by determining the angle θ by angle calculation using the ratio between the voltage Vout1 corresponding to the intensity of the magnetic field component Hsx and the voltage Vout2 corresponding to the intensity of the magnetic field component Hsy, it is possible to reduce an influence of variations in the distance between the first magnet 10 and the magnetic sensor 20 on the angle θ. Further, according to the position detection device 1, because the angle θ of the composite magnetic field MF is determined by the angle calculation using the ratio between the voltage Vout1 corresponding to the intensity of the magnetic field component Hsx and the voltage Vout2 corresponding to the intensity of the magnetic field component Hsy, it is also possible to suppress a reduction in accuracy of detection of the stroke amount of the first magnet 10 due to a change in environmental temperature. A reason for this is as follows. Although the intensity of a magnetic field generated by a magnet typically varies with fluctuations in temperature, a temperature dependence of the intensity of the magnetic field component Hsx from the first magnet 10 and a temperature dependence of the intensity of the magnetic field component Hsy from the first magnet 10 coincide with each other. Accordingly, by using the ratio between the intensity of the magnetic field component Hsx and the intensity of the magnetic field component Hsy, the angle θ calculated is substantially constant regardless of the environmental temperature. According to the position detection device 1, it is therefore possible to accurately determine the stroke amount of the first magnet 10 on the basis of the angle θ calculated from the magnetic field component Hsx and the magnetic field component Hsy.

Figure 12A:
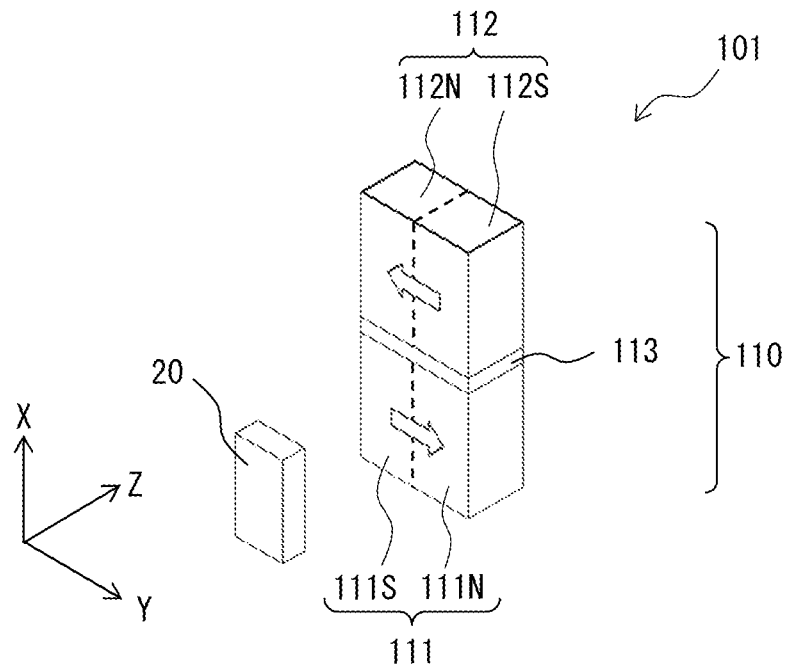
FIG. 12A is an enlarged perspective diagram illustrating a configuration example of a position detection device including a magnet according to one reference example.
Figure 12B:
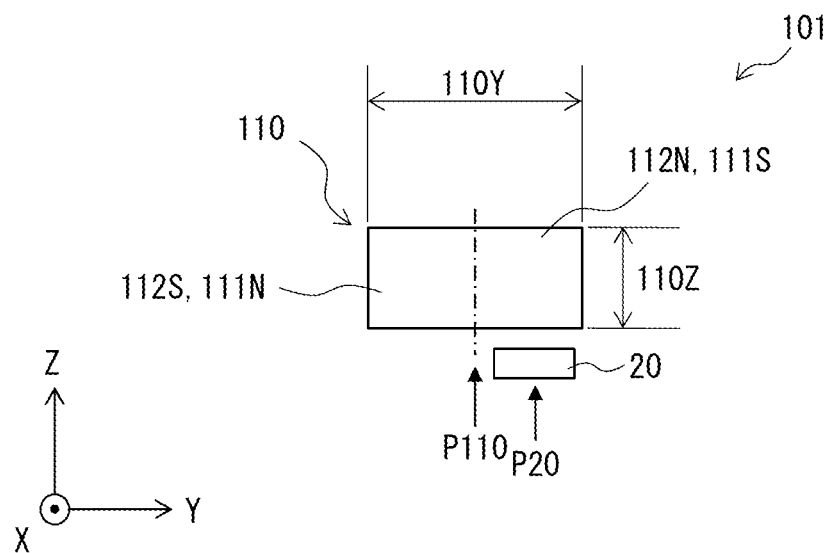
FIG. 12B is a schematic diagram for describing a positional relationship between the magnet and the magnetic sensor in the position detection device according to the reference example illustrated in FIG. 12A.

Next, to clarify the technical significance of the technology, a description is given of a position detection device 101 according to a reference example. The position detection device 101 includes, in place of the first magnet 10, a magnet 110 including a plurality of region portions magnetized in the Y-axis direction as illustrated in FIGS. 12A and 12B, and is configured to determine the stroke amount of the magnet 110. Note that the position detection device 101 according to this reference example has a configuration same as that of the position detection device 1 according to the present embodiment except that the magnet 110 is used in place of the first magnet 10. FIG. 12A is a schematic perspective view of the position detection device 101 according to the reference example, and corresponds to FIG. 4A illustrating the position detection device 1 according to the present embodiment. Further, FIG. 12B is a schematic top view of the position detection device 101 according to the reference example, and corresponds to FIG. 4B illustrating the position detection device 1 according to the present embodiment. The magnet 110 includes a first region portion 111, a second region portion 112, and a neutral zone 113. The first region portion 111 is magnetized in the +Y direction, and includes an N pole 111N and an S pole 111S adjacent to each other in the Y-axis direction. The second region portion 112 is magnetized in the −Y direction, and includes an N pole 112N and an S pole 112S adjacent to each other in the Y-axis direction. The neutral zone 113 is interposed between the first region portion 111 and the second region portion 112 in the X-axis direction. Further, in the magnet 110, the N pole 111N and the S pole 112S are disposed to be adjacent to each other in the X-axis direction with the neutral zone 113 interposed therebetween; and the N pole 112N and the S pole 111S are disposed to be adjacent to each other in the X-axis direction with the neutral zone 113 interposed therebetween. Further, the magnet 110 has a length 110Y in the Y-axis direction, and has a length 110Z in the Z-axis direction. The length 110Y is equal to the length 10Y of the first magnet 10, and the length 1102 is equal to the length 10Z of the first magnet 10. Further, the magnet 110 faces the magnetic sensor 20 in the Z-axis direction. Assume that the distance between the magnet 110 and the magnetic sensor 20 is equal to the distance between the first magnet 10 and the magnetic sensor 20. Furthermore, assume that an amount of offset of the center position P20 with respect to a center position P110 in the Y-axis direction is equal to an amount of offset of the center position P20 with respect to the center position P10 in the Y-axis direction.

Table 1 presents a result of determining, by simulation, a linearity error [%] associated with misalignment between the first magnet 10 and the magnetic sensor 20 in the position detection device 1 illustrated in, for example, FIG. 1. Note that in Table 1, the "offset amount [mm] in Y-axis direction" being +0.1 or +0.2 means that, with a predetermined reference position of the magnetic sensor 20 with respect to the first magnet 10 set at 0 [mm], the magnetic sensor 20 is located at a position moved by 0.1 mm or 0.2 mm in the +Y direction from the reference position with respect to the first magnet 10. Further, the "offset amount [mm] in Y-axis direction" being −0.1 or −0.2 means that, with the predetermined reference position of the magnetic sensor 20 with respect to the first magnet 10 set at 0 [mm], the magnetic sensor 20 is located at a position moved by 0.1 mm or 0.2 mm in the —Y direction from the reference position with respect to the first magnet 10. Similarly, in Table 1, the "offset amount [mm] in Z-axis direction" being +0.1 or +0.2 means that, with the predetermined reference position of the magnetic sensor 20 with respect to the first magnet 10 set at 0 [mm], the magnetic sensor 20 is located at a position moved by 0.1 mm or 0.2 mm in the +Z direction from the reference position with respect to the first magnet 10. The "offset amount [mm] in Z-axis direction" being −0.1 or −0.2 means that, with the predetermined reference position of the magnetic sensor 20 with respect to the first magnet 10 set at 0 [mm], the magnetic sensor 20 is located at a position moved by 0.1 mm or 0.2 mm in the −Z direction from the reference position with respect to the first magnet 10.

The linearity error [%] is determined from Equation (3) below.

$$\text{Linearity error [\%]} = (\Delta V / V \text{range}) \times 100 \quad (3)$$

Figure 13:
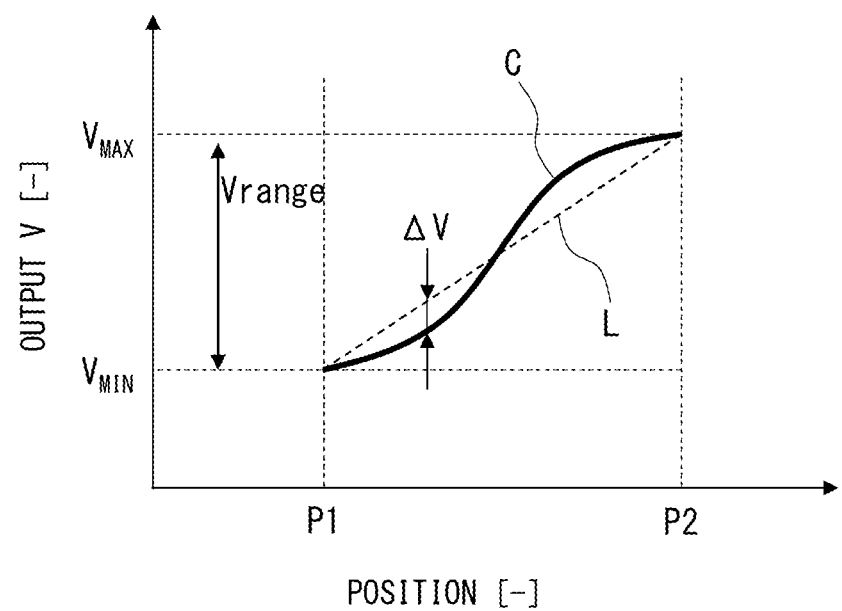
FIG. 13 is an explanatory diagram describing a linearity error of the position detection device illustrated in FIG. 1.

Here, $\Delta V$ is, as illustrated in FIG. 13, a difference between a change curve C of an output V of the magnetic sensor 20 from a position P1 to a position P2 within a movement range of the first magnet 10 in the X-axis direction with respect to the magnetic sensor 20 and a straight line L generated by linear approximation of the change curve C, the position P1 being a position where the output V of the magnetic sensor 20 is at a minimum value Vmin, the position P2 being a position where the output V of the magnetic sensor 20 is at a maximum value Vmax. Further, Vrange is a difference between the maximum value Vmax and the minimum value Vmin. The linearity error [%] calculated in this manner indicates that the smaller the value is, the smaller the measurement error is.

TABLE 1

|  |  | \multicolumn{5}{c}{Offset amount [mm] in Y-axis direction} |
| --- | --- | --- | --- | --- | --- | --- |
|  | First magnet 10 | −0.2 | −0.1 | 0.0 | +0.1 | +0.2 |
| Offset amount | +0.2 | 3.6 | 3.0 | 2.2 | 1.2 | 1.1 |
| [mm] | +0.1 | 2.6 | 1.9 | 1.1 | 0.6 | 1.9 |
| in Z-axis | 0.0 | 1.7 | 1.0 | 0.3 | 1.3 | 2.6 |
| direction | −0.1 | 1.0 | 0.3 | 0.9 | 2.0 | 3.2 |
|  | −0.2 | 0.4 | 0.6 | 1.5 | 2.5 | 3.6 |

Further, Table 2 presents a result of determining, by simulation, the linearity error [%] associated with misalignment between the magnet 110 and the magnetic sensor 20 in the position detection device 101 illustrated in FIGS. 12A and 12B. The foregoing definitions for Table 1 apply also to Table 2.

TABLE 2

|  |  | \multicolumn{5}{c}{Offset amount [mm] in Y-axis direction} |
| --- | --- | --- | --- | --- | --- | --- |
|  | First magnet 110 | −0.2 | −0.1 | 0.0 | +0.1 | +0.2 |
| Offset amount | +0.2 | 3.2 | 2.4 | 1.7 | 1.2 | 1.0 |
| [mm] | +0.1 | 2.1 | 1.4 | 1.3 | 1.3 | 1.4 |
| in Z-axis | 0.0 | 1.6 | 1.7 | 1.7 | 1.8 | 1.9 |
| direction | −0.1 | 2.1 | 2.1 | 2.2 | 2.4 | 2.5 |
|  | −0.2 | 2.6 | 2.7 | 2.8 | 2.9 | 3.0 |

It is seen by comparing Table 1 and Table 2 that the position detection device 1 is smaller in linearity error than the position detection device 101. In particular, a tendency is seen that the linearity error becomes larger in the position detection device 101 with increasing absolute value of the offset amount [mm] in the Y-axis direction.

According to the present embodiment, the first magnet 10 which is spaced from and faces the magnetic sensor 20 in the Z-axis direction is a multipolar magnet including a plurality of N poles and a plurality of S poles, the N and S poles being adjacent to each other in the Z-axis direction. This makes it possible to exhibit higher position detection accuracy, as seen above.

2. Second Embodiment

[Configuration of Distance Measurement Apparatus 401]

Next, with reference to FIGS. 14 to 16B, a description is given of a configuration of a distance measurement apparatus 401 according to a second embodiment of the technology. In the foregoing first embodiment, an example has been described in which the position detection device is applied to the imaging apparatus including the lens module. However, the position detection device of an embodiment of the technology is applicable also to a distance measurement apparatus described below.

Figure 14:
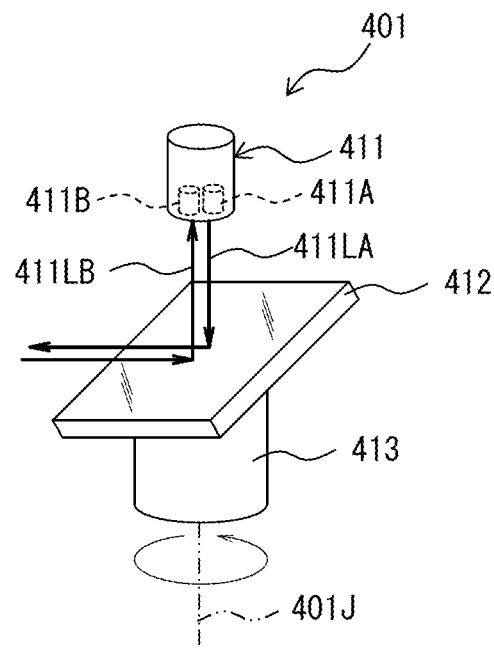
FIG. 14 is a perspective diagram illustrating an overall configuration of a distance measurement apparatus according to one example embodiment of the technology.

FIG. 14 is a perspective view of the distance measurement apparatus 401 according to the present embodiment.

The distance measurement apparatus 401 illustrated in FIG. 14 is an apparatus that measures a distance to a target object by detecting emitted light, and constitutes a portion of an on-vehicle light detection and ranging (LiDAR), for example. The distance measurement apparatus 401 includes a photoelectric unit 411 and an optical element 412, for example.

The photoelectric unit 411 includes an optical element 411A that emits light 411LA, and a detection element 411B that detects reflected light 411LB from the target object. The optical element 412 is, for example, a mirror supported by a support 413. The optical element 412 is inclined with respect to an output surface of the optical element 411A to change the respective directions of travel of the light 411LA and the reflected light 411LB. Further, the optical element 412 is configured to be rotated around a predetermined rotation axis 401J by a driving device.

[Configuration of Position Detection Device 1A]

Figure 15:
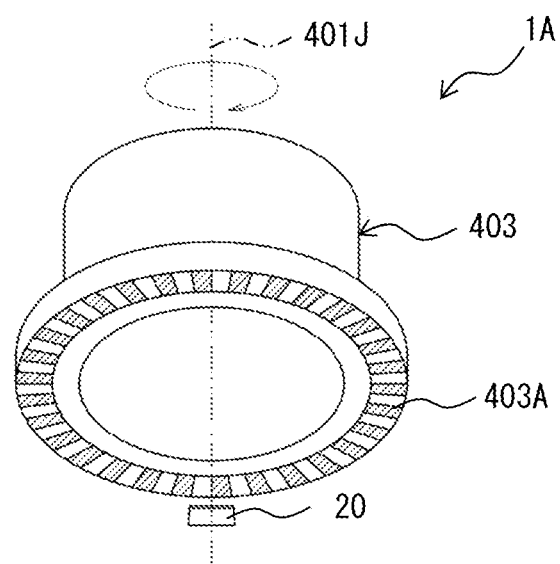
FIG. 15 is a perspective diagram illustrating an overall configuration of a position detection device to be mounted on the distance measurement apparatus illustrated in FIG. 14.

The distance measurement apparatus 401 further includes a position detection device 1A to detect a rotation position of the optical element 412. FIG. 15 is a schematic perspective diagram illustrating an appearance of the position detection device 1A. The position detection device 1A is a magnetic position detection device, and includes the magnetic sensor 20 described in the first embodiment and a magnetic field generator 403. The magnetic field generator 403 is configured to rotate around a predetermined rotation axis in conjunction with the optical element 412. The magnetic field generator 403 may rotate around the same rotation axis 401J with the optical element 412, or may rotate around a rotation axis different from that of the optical element 412. In the present embodiment, for the sake of convenience, the optical element 412 and the magnetic field generator 403 are assumed to rotate around the same rotation axis 401J.

The magnetic field generator 403 is a magnetic scale (a rotation scale) including multiple pairs of N and S poles that are alternately arranged around the rotation axis 401J.

The magnetic field generator 403 has an end face 403A located at an end in one direction parallel to the rotation axis 401J. The multiple pairs of N and S poles are provided along the end face 403A. For ease of understanding, the N poles, for example, are hatched in FIG. 15. The magnetic sensor 20 is disposed to face the end face 403A. An intensity of a magnetic field component at a reference position such as a position where the magnetic sensor 20 is disposed changes as the magnetic field generator 403 rotates.

Figure 16A:
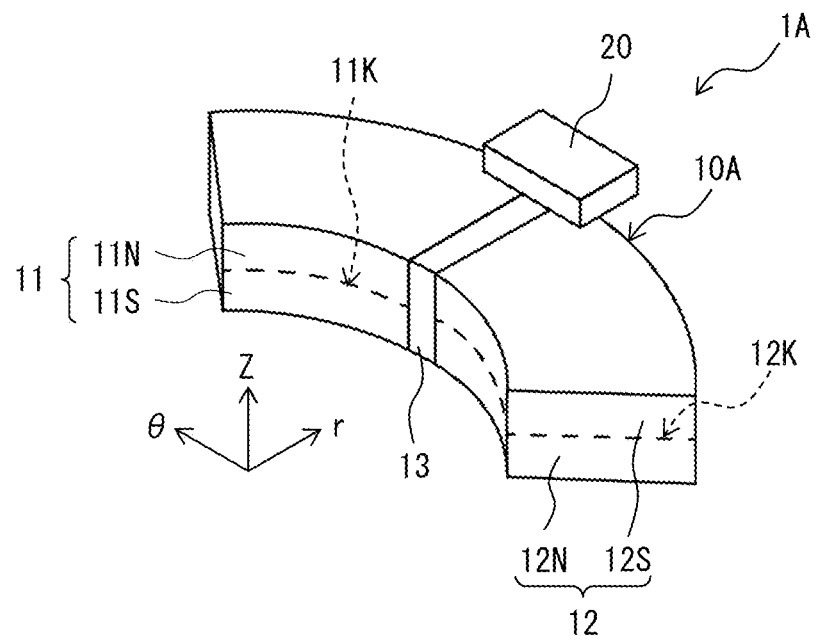
FIG. 16A is an enlarged perspective diagram illustrating, in an enlarged manner, a portion of the position detection device illustrated in FIG. 15.
Figure 16B:
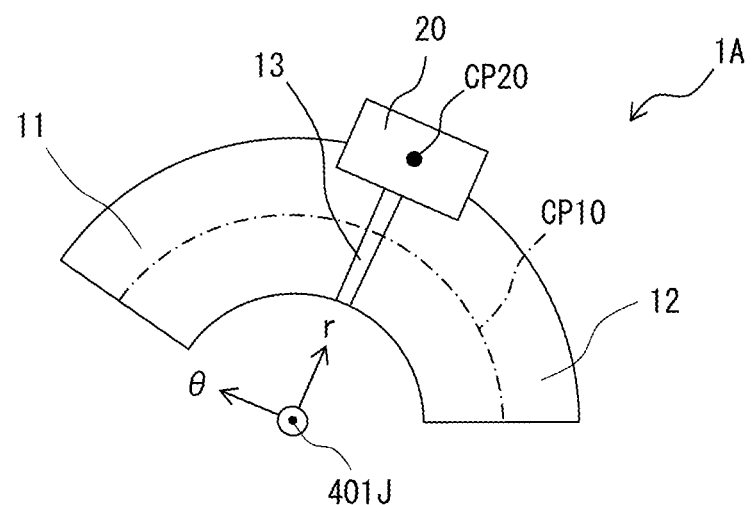
FIG. 16B is a plan diagram illustrating a positional relationship between a magnet and a magnetic sensor illustrated in FIG. 16A.

FIG. 16A is a perspective diagram illustrating a positional relationship between a magnet 10A included in the magnetic field generator 403 and the magnetic sensor 20 disposed in the vicinity thereof, FIG. 16B is a plan diagram illustrating, the positional relationship between the magnet 10A and the magnetic sensor 20 in an r-θ plane. The magnet 10A is provided in an annular shape along the end face 403A of the magnetic field generator 403. Note that FIGS. 16A and 16B illustrate a portion of the magnet 10A in an enlarged manner. Further, in FIGS. 16A and 16B, the Z-axis direction is a direction in which the rotation axis 401J extends, a θ direction is a direction of rotation of the magnetic field generator 403, and an r direction is a radial direction of the magnet 10A having an annular shape. Note that a center position CP20 of the magnetic sensor 20 is located more outward (located farther from the rotation axis 401J) in the r direction than a center position CP10 of the magnet 10A.

The magnet 10A is provided to be rotatable in the θ direction with respect to the magnetic sensor 20. As illustrated in FIG. 16A, the magnet 10A is disposed to be spaced from and face the magnetic sensor 20 in the Z-axis direction. The magnet 10A is a multipolar magnet including a plurality of N poles 11N and 12N and a plurality of S poles 11S and 12S. Here, the N pole 11N and the S pole 11S are adjacent to each other in the Z-axis direction. Further, the N pole 12N and the S pole 12S are adjacent to each other in the Z-axis direction. The magnet 10A includes the first region portion 11, the second region portion 12, and the neutral zone 13. The first region portion 11 is magnetized, for example, in the −Z direction, and the second region portion 12 is magnetized in the +Z direction opposite to the −Z direction. The neutral zone 13 is interposed between the first region portion 11 and the second region portion 12 in the θ direction. The first region portion 11 and the second region portion 12 are adjacent to each other in the θ direction which is the direction of rotational movement of the magnet 10A, with the neutral zone 13 interposed therebetween. The first region portion 11 includes the N pole 11N and the S pole 11S adjacent to each other along the Z-axis direction. The second region portion 12 includes the N pole 12N and the S pole 12S adjacent to each other along the Z-axis direction. Here, the N pole 11N and the S pole 12S are disposed to be adjacent to each other in the θ direction with the neutral zone 13 interposed therebetween; and the N pole 12N and the S pole 11S are disposed to be adjacent to each other in the θ direction with the neutral zone 13 interposed therebetween.

The distance measurement apparatus 401 having such a configuration generates an output having a correspondence with the rotation position of the optical element 412 on the basis of the detection signal generated by the magnetic sensor 20. Note that the rotation position of the optical element 412 has a correspondence with the rotation position of the magnetic field generator 403.

Table 3 presents a result of determining, by simulation, the linearity error [%] associated with misalignment between the magnet 10A and the magnetic sensor 20 in the position detection device 1A illustrated in FIGS. 16A and 16B.

TABLE 3

| Magnet 10A | | Offset amount [mm] in Y-axis direction | | | | |
|---|---|---|---|---|---|---|
| | | −0.2 | −0.1 | 0.0 | +0.1 | +0.2 |
| Offset amount [mm] in Z-axis direction | +0.2 | 1.9 | 0.8 | 0.3 | 0.9 | 1.5 |
| | +0.1 | 1.4 | 0.7 | 0.1 | 0.7 | 1.2 |
| | 0.0 | 1.0 | 0.6 | 0.1 | 0.6 | 1.0 |
| | −0.1 | 0.7 | 0.4 | 0.2 | 0.5 | 0.9 |
| | −0.2 | 0.5 | 0.6 | 0.3 | 0.4 | 0.8 |

Figure 17A:
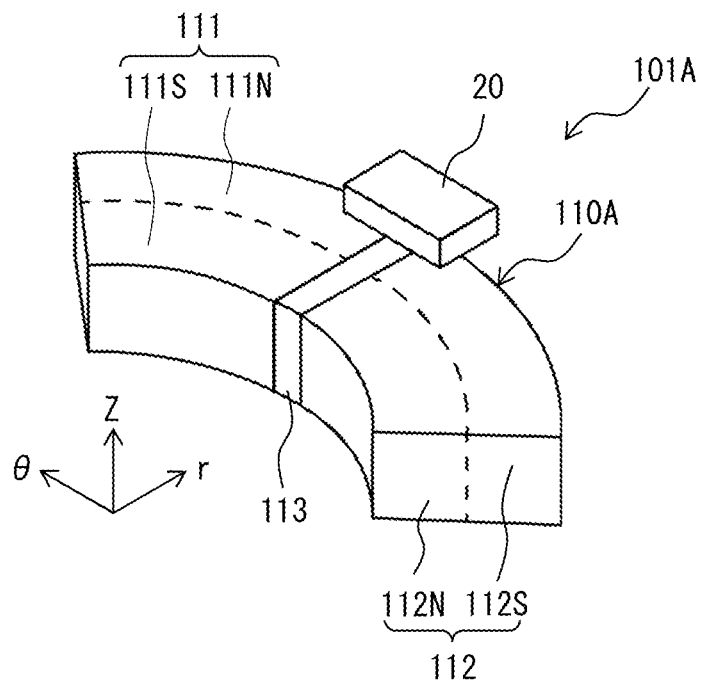
FIG. 17A is an enlarged perspective diagram illustrating, in an enlarged manner, a portion of a position detection device according to one reference example.
Figure 17B:
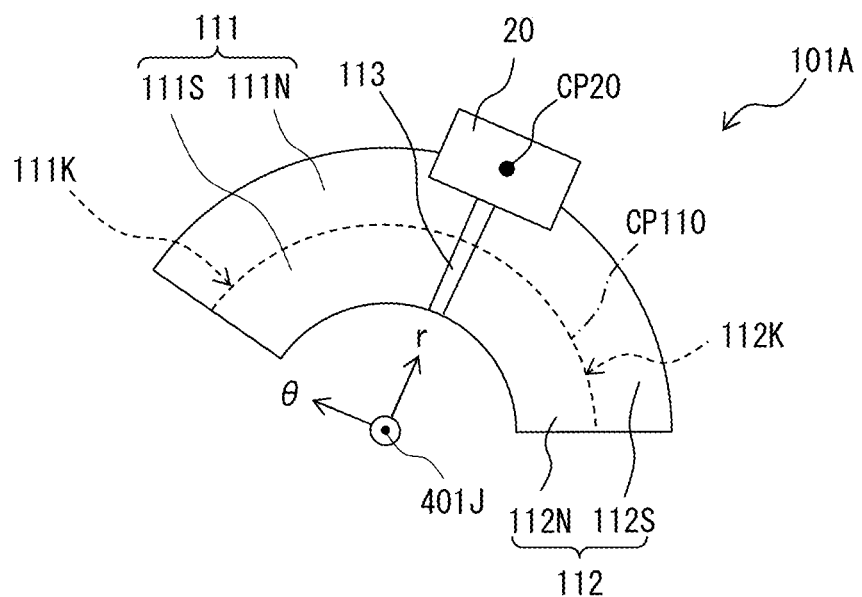
FIG. 17B is a plan diagram illustrating a positional relationship between a magnet and a magnetic sensor illustrated in FIG. 17A.

Further. Table 4 presents a result of determining, by simulation, the linearity error [%] associated with misalignment between a magnet 110A and the magnetic sensor 20 in a position detection device 101A according to a reference example illustrated in FIGS. 17A and 17B. FIG. 17A is a perspective diagram illustrating a positional relationship between the magnet 110A according to the reference example and the magnetic sensor 20 disposed in the vicinity thereof. FIG. 17B is a plan diagram illustrating the positional relationship between the magnet 110A and the magnetic sensor 20 in the r–θ plane. In the position detection device 101A of FIGS. 17A and 17B, as with the position detection device 1A, the magnet 110A is configured to rotate with respect to the magnet 20 in the θ direction around a rotation axis extending in the Z-axis direction. Further, as with the position detection device 1A, the magnet 110A and the magnetic sensor 20 face each other in the Z-axis direction. In the magnet 110A, however, the N poles 111N and 112N and the S poles 111s and 112S are adjacent to each other in the r direction which is the radial direction of the magnet 110A. In other words, while the magnet 110A is magnetized in the r direction, the magnet 110A and the magnetic sensor 20 face each other in the Z-axis direction; thus, these directions are not coincident with each other. Note that in the position detection device 101A, the center position CP20 of the magnetic sensor 20 is located more outward (located farther from the rotation axis 401J) in the r direction than a center position CP110 of the magnet 110A.

TABLE 4

| Magnet 110A | | Offset amount [mm] in Y-axis direction | | | | |
|---|---|---|---|---|---|---|
| | | −0.2 | −0.1 | 0.0 | +0.1 | +0.2 |
| Offset amount [mm] in Z-axis direction | +0.2 | 1.5 | 0.5 | 0.5 | 1.4 | 2.3 |
| | +0.1 | 2.1 | 1.0 | 0.2 | 1.2 | 2.2 |
| | 0.0 | 3.0 | 1.6 | 0.3 | 0.9 | 2.0 |
| | −0.1 | 4.0 | 2.4 | 1.0 | 0.5 | 1.8 |
| | −0.2 | 5.4 | 3.5 | 1.8 | 0.3 | 1.5 |

It is seen by comparing Table 3 and Table 4 that the position detection device 1A is smaller in linearity error than the position detection device 101A. In particular, a tendency is seen that the linearity error becomes larger in the position detection device 101A with increasing absolute value of the offset amount [mm] in the Y-axis direction.

[Configuration Example of Position Detection Device 1B of Modification Example]

In the position detection device 1A illustrated in, for example, FIG. 15, the magnet 10A and the magnetic sensor 20 are disposed to face each other along the rotation axis 401J around which the magnet 10A rotates. However, the technology is not limited thereto. For example, as in a position detection device 1B including a magnet 10B according to a modification example illustrated in FIG. 18, the magnet 10B and the magnetic sensor 20 may be disposed to face each other in the r direction which is the radial direction of the magnet 10B having an annular shape. Note that in this case, the magnetizing direction of the magnet 10B is also the r direction. In other words, the N pole 11N and the S pole 11S are adjacent to each other in the r direction in the first region portion 11, and the N pole 12N and the S pole 12S are adjacent to each other in the r direction in the second region portion 12.

Figure 18:
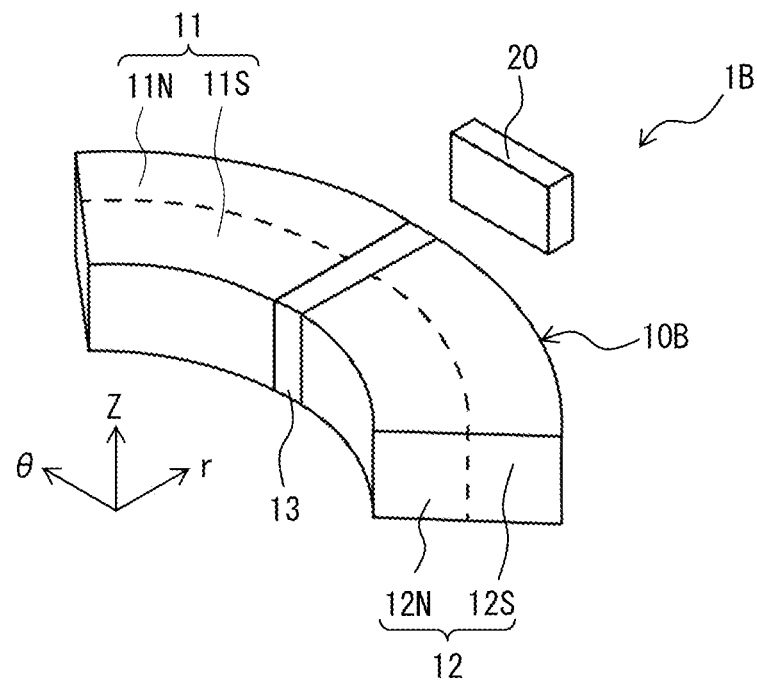
FIG. 18 is an enlarged perspective diagram illustrating, in an enlarged manner, a portion of a position detection device according to a modification example to be mounted on the distance measurement apparatus illustrated in FIG. 14.

Table 5 presents a result of determining, by simulation, the linearity error [%] associated with misalignment between the magnet 10B and the magnetic sensor 20 in the position detection device 1B illustrated in FIG. 18.

TABLE 5

| Magnet 10B | | Offset amount [mm] in Y-axis direction | | | | |
|---|---|---|---|---|---|---|
| | | −0.2 | −0.1 | 0.0 | +0.1 | +0.2 |
| Offset amount [mm] in Z-axis direction | +0.2 | 1.1 | 0.6 | 0.2 | 0.4 | 0.8 |
| | +0.1 | 1.3 | 0.8 | 0.4 | 0.1 | 0.4 |
| | 0.0 | 1.4 | 1.0 | 0.6 | 0.2 | 0.2 |
| | −0.1 | 1.5 | 1.1 | 0.8 | 0.4 | 0.2 |
| | −0.2 | 1.5 | 1.2 | 0.9 | 0.6 | 0.3 |

Figure 19:
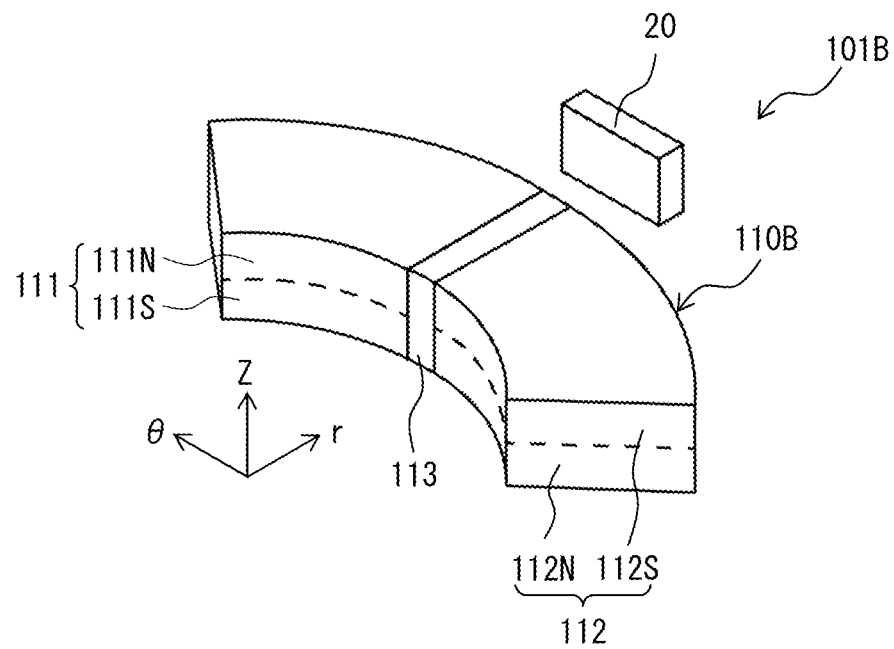
FIG. 19 is an enlarged perspective diagram illustrating, in an enlarged manner, a portion of a position detection device according to one reference example.

Further, Table 6 presents a result of determining, by simulation, the linearity error [%] associated with misalignment between a magnet 110B and the magnetic sensor 20 in a position detection device 101B illustrated in FIG. 19. In the position detection device 101B of FIG. 19, as with the position detection device 1B, the magnet 110B is configured to rotate with respect to the magnetic sensor 20 in the θ direction around a rotation axis extending in the Z-axis direction. Further, as with the position detection device 1B the magnet 110B and the magnetic sensor 20 face each other in an r-axis direction. In the magnet 110B, however, the N poles 111N and 112N and the S poles 11S and 112S are adjacent to each other in the Z-axis direction which is the rotation-axis direction of the magnet 110B. In other words, while the magnet 110B is magnetized in the Z-axis direction, the magnet 110B and the magnetic sensor 20 face each other in the r direction; thus, these directions are not coincident with each other.

TABLE 6

| Magnet 110B | | Offset amount [mm] in Y-axis direction | | | | |
|---|---|---|---|---|---|---|
| | | −0.2 | −0.1 | 0.0 | +0.1 | +0.2 |
| Offset amount [mm] in Z-axis direction | +0.2 | 15.8 | 11.8 | 7.3 | 2.6 | 7.6 |
| | +0.1 | 16.1 | 12.3 | 8.2 | 3.8 | 5.6 |
| | 0.0 | 16.4 | 12.8 | 8.9 | 4.8 | 3.9 |
| | −0.1 | 16.7 | 13.2 | 9.5 | 5.7 | 2.5 |
| | −0.2 | 17.0 | 13.6 | 10.1 | 6.4 | 2.7 |

It is seen by comparing Table 5 and Table 6 that the position detection device 1B is smaller in linearity error than the position detection device 101B. In particular, a tendency is seen that the linearity error becomes larger in the position detection device 101B with increasing absolute value of the offset amount [mm] in the Y-axis direction.

2. Modification Examples

Although the technology has been described hereinabove with reference to some embodiments, the technology is not limited to the foregoing embodiments, and various modifications may be made. For example, in the foregoing embodiments, four resistors are used to form a full-bridge circuit in the magnetic sensor; however, in some embodiments of the technology, for example, two resistors may be used to form a half-bridge circuit. Further, the magnetoresistive effect elements may be identical with each other or different from each other in shape and dimensions. Further, the resistors may each include a magnetic detection element, for example. The magnetic detection element may be any element that has a function of sensing a magnetic field. The term "magnetic detection element" thus refers to a concept that encompasses not only a spin-valve MR element but also an anisotropic magnetoresistive effect element (an AMR element), a Hall element (e.g., a planar Hall element and a vertical Hall element), and the like. Typically, the planar Hall element tends to have a sensitive axis perpendicular to a substrate, and the magnetoresistive effect element and the vertical Hall element tend to have a sensitive axis parallel to the substrate. In one embodiment of the technology, it is preferable to use a magnetic detection element having a sensitive axis parallel to the substrate or to a plane orthogonal to the Z-axis. Further, the dimensions of each component and the layout of the components are mere examples and are non-limiting.

Further, the position detection device of an embodiment of the technology is not limited to a device intended to detect the position of a lens, and may be a device intended to detect the position of any object other than a lens in a space.

Further, in the foregoing first embodiment, the first magnet 10 includes two region portions (the first region portion 11 and the second region portion 12). However, the first multipolar magnet of an embodiment of the technology is not limited thereto, and may include three or more region portions, for example.

It is to be noted that, as used herein, the term "orthogonal" refers to a concept that encompasses not only being geometrically exactly 90° but also being 90° plus or minus a manufacturing error or so, e.g., plus or minus about 5°.

The position detection device, the lens module, the imaging apparatus, and the distance measurement apparatus according to at least one embodiment of the technology each make it possible to exhibit high position detection accuracy.

Correspondences between the reference signs and the constituent elements of the present embodiments are collectively presented in the following.

100 . . . imaging apparatus, 200 . . . image sensor, 300 . . . lens module, 401 . . . distance measurement apparatus, 1, 1A, 1B . . . position detection device, 3 . . . driving device, 4 . . . controller, 5 . . . lens, 6 . . . housing, 7 . . . substrate, 7a . . . top surface, 7K . . . opening, 11 . . . first region portion, 12 . . . second region portion, 13 . . . neutral zone, 31 . . . first magnet, 32 . . . second magnet, 14 . . . first holding member, 15 . . . second holding member, 16 . . . wire, 17 . . . spring, 20, 30 . . . magnetic sensor, 41 to 46 . . . coil, 150 . . . MR element, 162 . . . lower electrode, 163 . . . upper electrode, 151 . . . magnetization free layer, 152 . . . nonmagnetic layer, 153 . . . magnetization pinned layer, 154 . . . antiferromagnetic layer, MF1 . . . first magnetic field, MF2 . . . second magnetic field, MF . . . composite magnetic field

What is claimed is:
1. A position detection device comprising:
a magnetic sensor; and
a first magnetic field generator disposed to be spaced from and face the magnetic sensor in a first-axis direction, including a first multipolar magnet, and generating a first magnetic field to be exerted on the magnetic sensor, the first multipolar magnet including a plurality of N poles and a plurality of S poles, the N and S poles being adjacent to each other in the first-axis direction, wherein the magnetic sensor and the first magnetic field generator are provided to be relatively movable with respect to each other in a second-axis direction orthogonal to the first-axis direction, and a center position of the magnetic sensor in a third-axis direction orthogonal to both the first-axis direction and the second-axis direction is different from a center position of the first multipolar magnet in the third-axis direction.

2. The position detection device according to claim 1, wherein a dimension of the first multipolar magnet in the first-axis direction is smaller than a dimension of the first multipolar magnet in the third-axis direction.

3. The position detection device according to claim 1, wherein at least a portion of the magnetic sensor and at least a portion of the first multipolar magnet overlap each other in the first-axis direction.

4. The position detection device according to claim 1, wherein the second-axis direction comprises a direction of rotation around a rotation center axis along the third-axis direction.

5. The position detection device according to claim 1, wherein the second-axis direction comprises a direction of rotation around a rotation center axis along the first-axis direction.

6. The position detection device according to claim 1, wherein the first multipolar magnet has a curved shape in a first plane orthogonal to the third-axis direction.

7. The position detection device according to claim 1, wherein the first multipolar magnet has a substantially rectangular parallelepiped outer shape as a whole.

8. The position detection device according to claim 1, wherein the first multipolar magnet has a curved shape in a second plane orthogonal to the first-axis direction.

9. The position detection device according to claim 1, wherein the first magnetic field includes a first magnetic field component, and a second magnetic field component having a phase difference with respect to the first magnetic field component, and the magnetic sensor generates a detection signal corresponding to a direction of a magnetic field to be detected in which the first magnetic field component and the second magnetic field component are composited in a plane orthogonal to the first-axis direction, and is able to detect a change in position of the first magnetic field generator.

10. The position detection device according to claim 1, wherein the first multipolar magnet includes a first N pole and a second N pole as the plurality of N poles, and includes a first S pole and a second S pole as the plurality of S poles, the first N pole and the first S pole are disposed adjacent to each other in the first-axis direction, the second N pole and the second S pole are disposed adjacent to each other in the first-axis direction, the first N pole and the second S pole are disposed adjacent to each other in the second-axis direction, and the second N pole and the first S pole are disposed adjacent to each other in the second-axis direction.

11. The position detection device according to claim 1, wherein the first multipolar magnet includes a first region portion magnetized in a first direction along the first-axis direction, and a second region portion magnetized in a second direction that is along the first-axis direction and opposite to the first direction.

12. The position detection device according to claim 11, wherein the first multipolar magnet further includes a neutral zone between the first region portion and the second region portion.

13. The position detection device according to claim 12, wherein the neutral zone extends along a third plane orthogonal to the second-axis direction.

14. The position detection device according to claim 1, wherein the first multipolar magnet has a longitudinal direction along the second-axis direction.

15. The position detection device according to claim 1, wherein an interface between the N and S poles adjacent to each other in the first-axis direction extends along a first plane orthogonal to the first-axis direction.

16. The position detection device according to claim 1, wherein the magnetic sensor and the first multipolar magnet are provided to be relatively movable with respect to each other along the second-axis direction while keeping a state of overlapping each other in the first-axis direction.

17. The position detection device according to claim 1, further comprising a second magnetic field generator generating a second magnetic field, wherein the first magnetic field generator is provided to be movable along the second-axis direction with respect to the magnetic sensor and the second magnetic field generator owing to the second magnetic field.

18. A lens module comprising:

a magnetic sensor;

a first magnetic field generator disposed to be spaced from and face the magnetic sensor in a first-axis direction, including a first multipolar magnet, and generating a first magnetic field to be exerted on the magnetic sensor, the first multipolar magnet including a plurality of N poles and a plurality of S poles, the N and S poles being adjacent to each other in the first-axis direction;

a second magnetic field generator generating a second magnetic field; and a lens, wherein the magnetic sensor and the second magnetic field generator are provided to be relatively movable with respect to the first magnetic field generator and the lens in a second-axis direction orthogonal to the first-axis direction, and a center position of the magnetic sensor in a third-axis direction orthogonal to both the first-axis direction and the second-axis direction is different from a center position of the first multipolar magnet in the third-axis direction.

19. An imaging apparatus comprising an imaging element, and a lens module, wherein the lens module includes:

a magnetic sensor;

a first magnetic field generator disposed to be spaced from and face the magnetic sensor in a first-axis direction, including a first multipolar magnet, and generating a first magnetic field to be exerted on the magnetic sensor, the first multipolar magnet including a plurality of N poles and a plurality of S poles, the N and S poles being adjacent to each other in the first-axis direction;

a second magnetic field generator generating a second magnetic field; and a lens, the magnetic sensor and the second magnetic field generator are provided to be relatively movable with respect to the first magnetic field generator and the lens in a second-axis direction orthogonal to the first-axis direction, and a center position of the magnetic sensor in a third-axis direction orthogonal to both the first-axis direction and the second-axis direction is different from a center position of the first multipolar magnet in the third-axis direction.

20. A distance measurement apparatus that measures a distance to a target object by detecting emitted light, the distance measurement apparatus comprising:

an optical element configured to change a direction of travel of the light and to rotate;

a magnetic sensor; and a magnetic field generator disposed to be spaced from and face the magnetic sensor in a first-axis direction, including a multipolar magnet, and generating a magnetic field to be exerted on the magnetic sensor, the multipolar magnet including a plurality of N poles and a plurality of S poles, the N and S poles being adjacent to each other in the first-axis direction, wherein the magnetic sensor and the magnetic field generator are provided to be relatively movable with respect to each other in a second-axis direction orthogonal to the first-axis direction, the magnetic field generator is configured to rotate in the second-axis direction around a rotation axis in conjunction with the optical element, and a center position of the magnetic sensor in a third-axis direction orthogonal to both the first-axis direction and the second-axis direction is different from a center position of the first multipolar magnet in the third-axis direction.

21. The position detection device according to claim 2, wherein at least a portion of the magnetic sensor and at least a portion of the first multipolar magnet overlap each other in the first-axis direction.

22. The position detection device according to claim 1, wherein the plurality of N poles includes a first N pole and a second N pole, the plurality of S poles includes a first S pole and a second S pole, the first N pole and the first S pole are adjacent to each other in the first-axis direction, and the second N pole and the second S pole are adjacent to each other in the first-axis direction.

\* \* \* \* \*